(12) United States Patent
Marcu et al.

(10) Patent No.: US 10,579,538 B2
(45) Date of Patent: Mar. 3, 2020

(54) PREDICTING ADDRESSES IN NON-VOLATILE STORAGE

(71) Applicant: Western Digital Technologies, Inc., San Jose, CA (US)

(72) Inventors: Alon Marcu, Tel-Mond (IL); Judah Gamliel Hahn, Ofra (IL); Shay Benisty, Beer Sheva (IL); Alexander Bazarsky, Holon (IL); Ariel Navon, Revava (IL)

(73) Assignee: Western Digital Technologies, Inc., San Jose, CA (US)

( * ) Notice: Subject to any disclaimer, the term of this patent is extended or adjusted under 35 U.S.C. 154(b) by 75 days.

(21) Appl. No.: 15/901,432

(22) Filed: Feb. 21, 2018

(65) Prior Publication Data

US 2019/0258585 A1  Aug. 22, 2019

(51) Int. Cl.
*G06F 12/02* (2006.01)
*G06F 12/10* (2016.01)

(52) U.S. Cl.
CPC ...... *G06F 12/10* (2013.01); *G06F 2212/1024* (2013.01); *G06F 2212/651* (2013.01)

(58) Field of Classification Search
CPC ............ G06F 12/0246; G06F 11/0727; G06F 16/2228
See application file for complete search history.

(56) References Cited

U.S. PATENT DOCUMENTS

| | | | |
|---|---|---|---|
| 6,891,740 B2 | 5/2005 | Williams | |
| 7,996,623 B2 | 8/2011 | Walker | |
| 8,307,164 B2 | 11/2012 | Pelleg et al. | |
| 9,547,459 B1* | 1/2017 | BenHanokh | G06F 3/0689 |
| 10,222,990 B2 | 3/2019 | Bazarsky et al. | |
| 2008/0005736 A1* | 1/2008 | Apacible | G06F 9/4843 718/100 |
| 2010/0131805 A1* | 5/2010 | Katsuragi | G06F 11/0727 714/54 |
| 2011/0299317 A1* | 12/2011 | Shaeffer | G11C 13/0002 365/106 |
| 2015/0058539 A1* | 2/2015 | Huang | G06F 16/2228 711/103 |
| 2015/0074337 A1* | 3/2015 | Jo | G06F 12/0246 711/103 |
| 2016/0246726 A1* | 8/2016 | Hahn | G06F 12/0862 |

OTHER PUBLICATIONS

U.S. Appl. No. 15/816,204, filed Nov. 17, 2017 by Hahn et al.

* cited by examiner

*Primary Examiner* — Ryan Bertram
*Assistant Examiner* — Trang K Ta
(74) *Attorney, Agent, or Firm* — Vierra Magen Marcus LLP

(57) ABSTRACT

Memory systems that can predict a physical address associated with a logical address, and methods for use therewith, are described herein. In one aspect, the memory system predicts a physical address for a logical address that follows a sequence of random logical addresses. The predicted physical address could be a physical location where the data for the logical address is predicted to be stored. In some cases, the host data can be returned without accessing a management table. The predicted physical address is not required to be the location of the data to be returned to the host for the logical address. In one aspect, the memory system predicts a physical address at which information is stored that may be used to ultimately provide the data for the logical address, such as a location in the management table.

19 Claims, 15 Drawing Sheets

PREDICTING ADDRESSES IN NON-VOLATILE STORAGE

BACKGROUND

The present disclosure relates to technology for non-volatile storage.

One type of non-volatile storage is semiconductor memory. For example, non-volatile semiconductor memory is used in solid state drives, mobile computing devices, non-mobile computing devices and other memory systems. Typically, the memory system has a memory controller which controls data transfers between the memory system and a host system over a communication interface. The host system could be computer system, cellular telephone, server, etc.

When a host system writes data to and reads data from a memory system (also referred to as a storage device), the host writes and reads data in terms of logical addresses, such as logical block addresses (LBAs). Herein, the data the host writes or reads may be referred to as "host data." The memory controller may translate the logical addresses to physical addresses of memory cells on the memory system. As one example, a flash memory device has a Flash Transfer Layer (FTL) or Media Management Layer (MML) that performs a logical address to physical address translation.

The memory system may have a management table that contains information to perform the logical address to physical address translation. The management table could be stored in non-volatile memory, with portions of the management table cached in volatile memory for quick access. In some cases, the management table has a hierarchical organization, with multiple levels. In order to convert from the logical address to the physical address at which the data for the logical address is stored, the memory controller might need to read more than one level of the hierarchy. Thus, it could take more than one memory access to convert the logical address to a physical address.

DETAILED DESCRIPTION

Figure 1A:
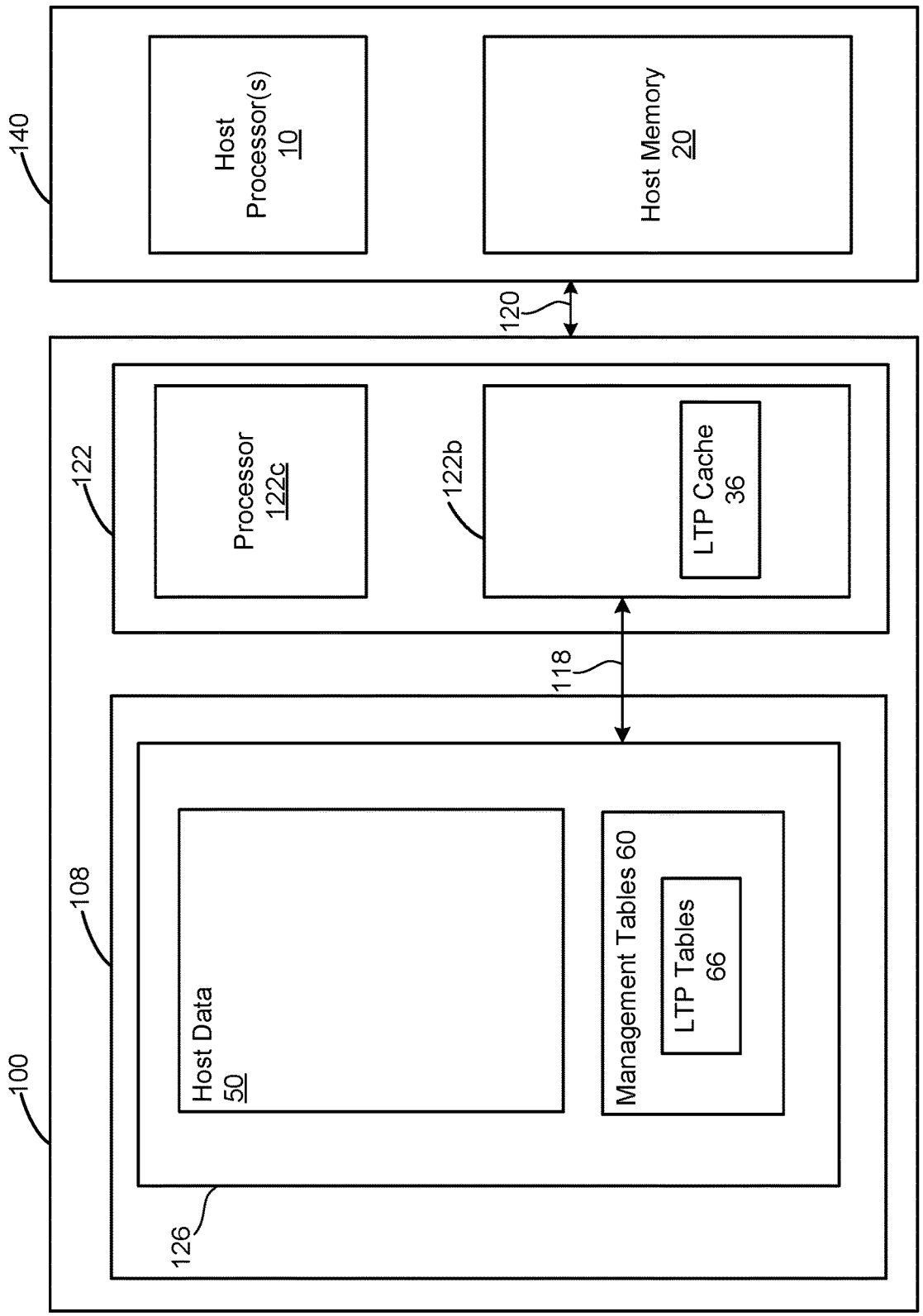
FIG. 1A is a block diagram depicting one embodiment of a memory system connected to a host system (or embedded in the host system) that can implement embodiments of the present technology described below.

Memory systems that can predict a physical address associated with a logical address, and methods for use therewith, are described herein. In one embodiment, the memory system predicts a physical address for a logical address that is expected to follow a sequence of random logical addresses. By a sequence of "random" logical addresses it is meant that the logical addresses are not all consecutive. The sequence of random logical addresses might have been provided by a host system in memory access requests (e.g., read or write requests). The predicted physical address could be a physical location where the data for a logical address in a read request is predicted to be stored. In some cases, the host data can be returned to the host without accessing a management table in non-volatile memory of the memory system. Thus, considerable time can be saved by avoiding a read of the management table. Note that in some cases more than one read of a management table can be avoided if, for example, the management table has a hierarchical structure. Also note that power may be saved but avoiding one or more sensing operations in the non-volatile memory.

Note that the predicted physical address is not required to be the location of the data to be returned to the host for the logical address in a read request. In one embodiment, the memory system predicts a physical address at which information is stored that may be used to ultimately provide the data for the logical address in the read request. For example, the predicted address could be a location in the management table. The information in the predicted address in the management table could include the physical address at which the host data is stored. Note that the management table can have a hierarchical organization, which potentially could require more than one memory access to convert from the logical address to the physical address at which data is stored to be returned to the host. Predicting a physical address of one level of the hierarchy can avoid one or more memory accesses of the management table. Thus, the data can be returned to the host more rapidly.

In one embodiment, the memory system has prediction logic that uses a sequence of random logical addresses that are received in memory access requests to predict a physical address in non-volatile memory in the memory system. In one embodiment, the predicted physical address is for a logical address that not in the sequence of random logical addresses. For example, the predicted physical address may be for a logical address that is expected to follow the sequence of random logical addresses. However, the prediction logic is also capable of predicting physical addresses for logical addresses in the sequence of random logical addresses, in one embodiment.

In one embodiment, the prediction logic uses pattern matching to predict a physical address associated with a logical address. The memory system may have stored patterns of sequences of random logical addresses, along with corresponding physical addresses. The prediction logic may use pattern matching to look for a stored pattern that is a best match for a sequence of random logical addresses that is received in memory access requests. The prediction logic may return a physical address that is associated with a matching pattern. Note that the physical address may be a prediction of a physical address that corresponds to a logical address that is not in the sequence of random logical addresses. Thus, considerable time and/or power can be saved by not having to access a management table determine a physical address that corresponds to the logical address.

Machine learning is used, in one embodiment, to learn what physical address (or addresses) correspond to a logical address. The physical addresses may be learned offline, such as during a one-time initial configuration of the memory system, e.g., after the memory system has been manufactured but has not yet distributed for sale. The physical addresses can also be leaned in the field, as the memory system is processing commands from a host, after the memory system has been distributed.

In one embodiment, the memory system inputs a sequence of random logical addresses into a trained model. The model may have been previously trained by, for example, machine learning, to be able to predict one or more physical addresses that correspond to a sequence of random logical addresses. The model may predict physical addresses for logical addresses in the sequence of random logical addresses, as well as for logical addresses that are not in the sequence. For example, the trained model might predict a physical address for a logical address that is expected to follow the input sequence of random logical addresses. Thus, considerable time and/or power can be saved by not having to access a management table determine a physical address that corresponds to a logical address. In one embodiment, the trained model is a hidden Markoff model.

In the following detailed description, reference is made to the accompanying drawings that form a part hereof, and in which is shown by way of illustration specific illustrative embodiments. It is to be understood that other embodiments may be utilized and that mechanical and electrical changes may be made. The following detailed description is, therefore, not to be taken in a limiting sense. In the description that follows, like numerals or reference designators will be used to refer to like parts or elements throughout.

FIG. 1A is a block diagram depicting one embodiment of a memory system 100 connected to a host system 140 (or embedded in the host system 140) that can implement embodiments of the present technology described below. Referring to FIG. 1A, the host system 140 stores data into, and retrieves data from, the memory system 100 by issuing write and read requests. The memory system 100 may be embedded in the host system 140 or may exist in the form of a card, universal serial bus (USB) drive, or other removable drive, such as a solid state disk (SSD) that is removably connected to the host system 140 through a mechanical and electrical connector. The host system 140 may be any of a number of fixed or portable data generating devices, such as a personal computer, a smartphone, a personal digital assistant (PDA), a server, a set top box, or the like. More generally, the host system 140 can include host logic that performs the functions of a smartphone, PDA, laptop, server, set top box, etc. While not specifically shown, the host can include and/or be in communication with read only memory (ROM).

The host system 140, which can be referred to more succinctly as the host 140, may include one or more host processors 10. The host processors 10 may run one or more application programs. The application programs may be stored in host memory 20, which may include volatile and/or non-volatile memory. The application programs, when data is to be stored on or retrieved from the memory system 100, communicate through one or more operating system application programming interfaces (APIs) with a file system. The file system may be a software module executed on the processor(s) 10 and manages the files in the memory system 100. The file system manages clusters of data in logical address space. Common operations executed by a file system include operations to create, open, write (store) data, read (retrieve) data, seek a specific location in a file, move, copy, and delete files. The file system may be circuitry, software, or a combination of circuitry and software.

Communication channel 120 between the host 140 and the memory system 100 may be used to transfer commands, data, etc. The interface for communicating over the communication channel 120 may be any of a number of known interfaces, such as Secure Data (SD), Multimedia Card (MMC), Universal Serial Bus (USB) storage device, Serial Advanced Technology Attachment (SATA) and Small Computer Systems Interface (SCSI) interfaces. The host 140 may maintain a logical address range for all logical block addresses (LBAs) that have been assigned by the host 140 to data. In addition to being used to refer to the communication channel between the host 140 and the memory system 100, the reference number 120 can also be used to refer to host interface signals that are communicated over the communication channel 120.

The host 140 uses the file system to address files stored within the memory system 100, which can involve writing data to and reading data from the memory structure 126 of the memory system 100. The memory structure 126 contains non-volatile memory, in one embodiment. Exemplary types of file systems that can be used by the host 140 include, but are not limited to, FAT32, exFAT, ext2/3, HFS+. The memory system 100 will typically be designed to work with different types of hosts, each of which may use a different type of file system. This may result in the memory system 100 having poor write performance due to excessive pre-padding and/or post-padding of small chunks of data.

The memory system 100 includes a memory controller 122 (which can also be referred to as the controller 122) in communication with the memory die 108 via communication interface 118. Communication interface 118 may be any suitable interface, such as Open NAND Flash (ONFI) interface. The controller 122 has a processor 122c and volatile memory 122*b*. A portion of the volatile memory 122*b* may be used to store a cache of logical to physical mappings (L2P Cache 36). The controller 122 can use the logical to physical mappings to map logical block addresses in memory access requests from the host 140 to physical addresses of memory cells in the memory structure 126. For example, logical block addresses (LBAs) can be mapped to physical block addresses (PBAs). Such mappings can be used to directly map LBAs to the PBAs, or LBAs can be mapped to intermediate or virtual block addresses, which are mapped to PBAs.

The memory die 108 has a memory structure 126. The memory structure 126 is used to store host data 50. The memory structure 126 is also used to store management tables 60. The management tables may include L2P tables 66. Note that the LTP cache 36 is a cache of the L2P tables 66. Moreover, note that the L2P tables 66 have a hierarchical organization, in one embodiment. In such a hierarchical organization, a first level table may contain information that may map an LBA to one of a number of second level tables. Each second level table may contain information to map an LBA to one of a number of third level tables, etc. A table at the last level of the hierarchy may map the LBA to a PBA in the host data 50 at which data for the LBA is stored.

In one embodiment, processor 122*c* implements physical address prediction logic, which is used to predict a physical address for a logical address. In one embodiment, a sequence of random logical addresses is input to the address prediction logic, which may predict a physical address for a logical address the follows the sequence of random logical addresses. The predicted physical address could be PBA at which host data 50 is stored in non-volatile memory in the memory structure 126. The predicted physical address could be an address of some portion of the management table 60. For example, the physical address could be an L2P table 66 at a second level, third level, etc., in a hierarchy of LTP tables 66.

Figure 1B:
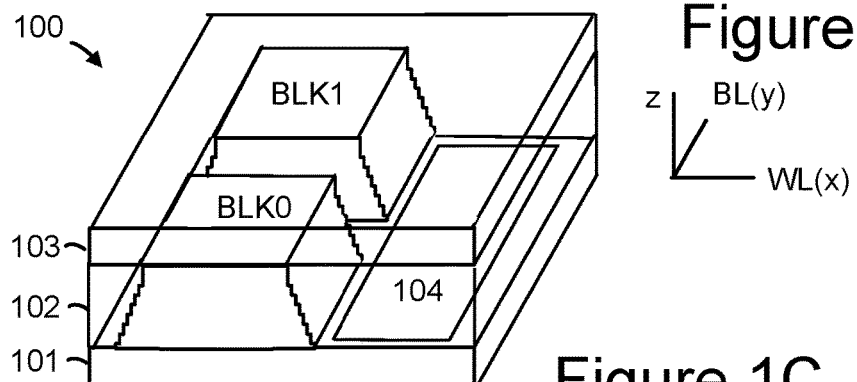
FIG. 1B is a perspective view of a three dimensional (3D) stacked non-volatile memory device.
Figure 1C:
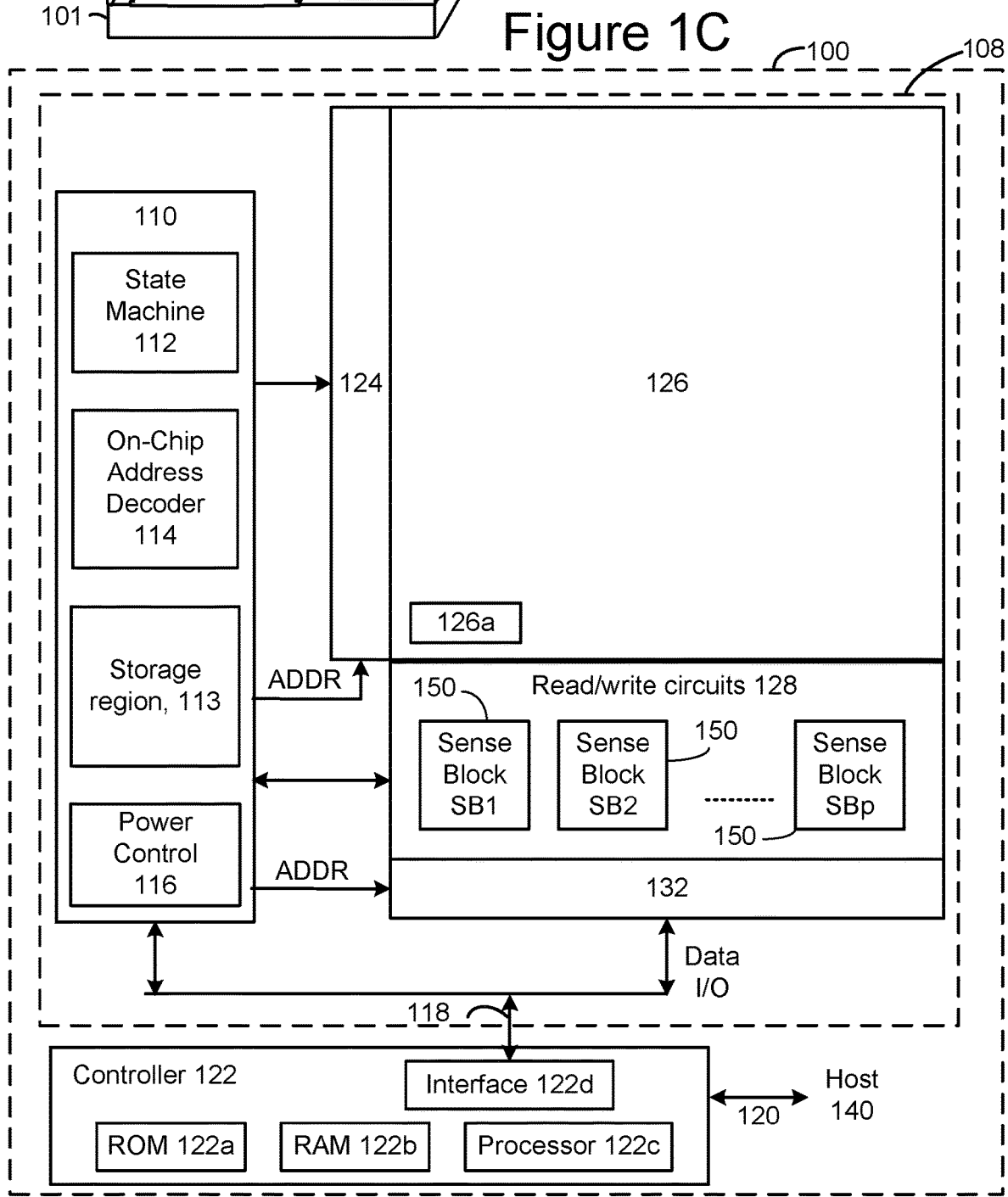
FIG. 1C is a functional block diagram of an example memory system such as the 3D stacked non-volatile memory system of FIG. 1B.
Figure 2:
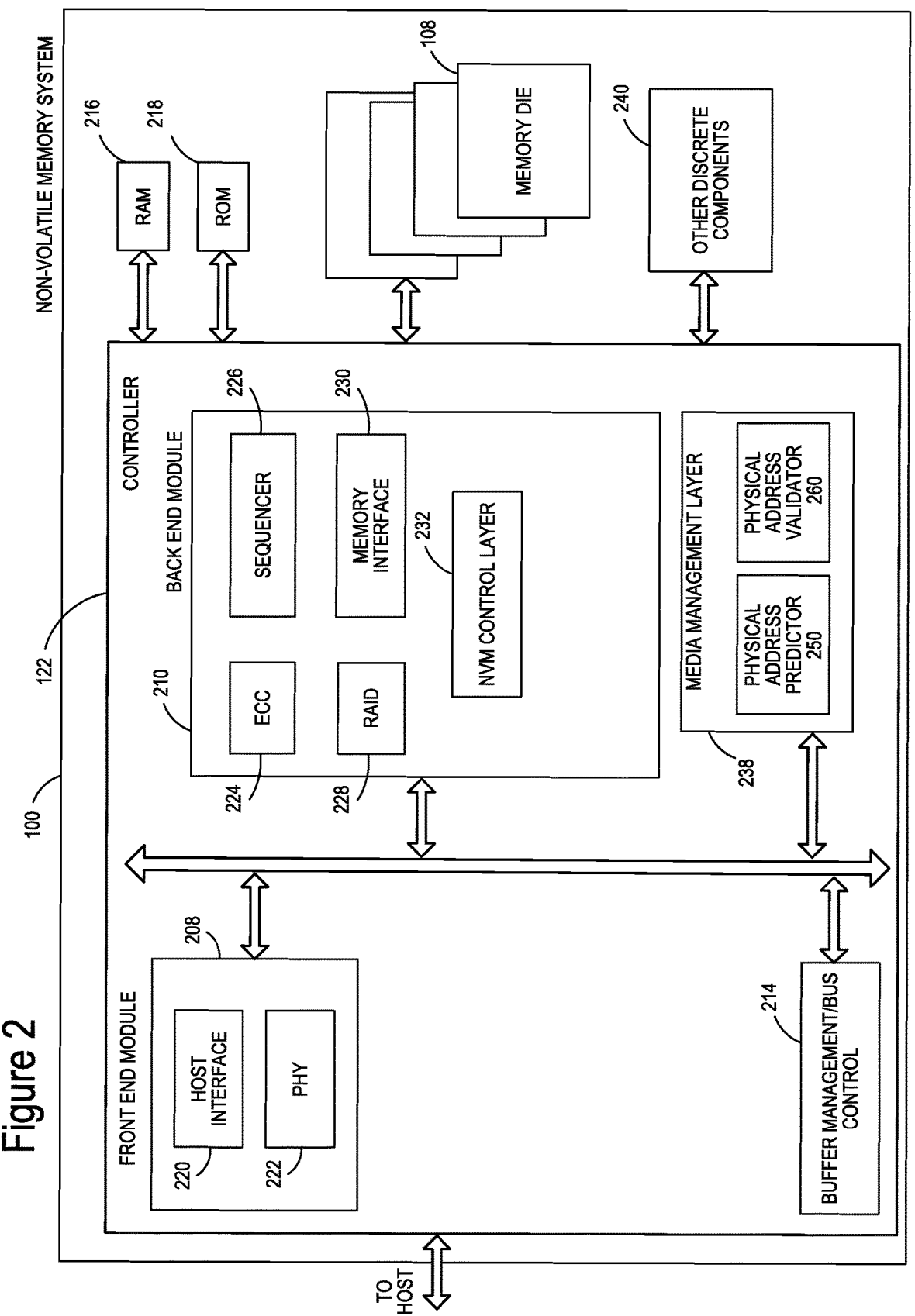
FIG. 2 is a block diagram of example memory system, depicting more details of one embodiment of a memory controller.

FIGS. 1B, 1C, and 2 describe one example of a memory system 100 that can be used to implement the technology proposed herein. FIG. 1B is a perspective view of a three dimensional (3D) stacked non-volatile memory device. The memory system 100 includes a substrate 101. On and above the substrate are example blocks BLK0 and BLK1 of memory cells (non-volatile storage elements). Also on substrate 101 is peripheral area 104 with support circuits for use by the blocks. Substrate 101 can also carry circuits under the blocks, along with one or more lower metal layers which are patterned in conductive paths to carry signals of the circuits. The blocks are formed in an intermediate region 102 of the memory device. In an upper region 103 of the memory device, one or more upper metal layers are patterned in conductive paths to carry signals of the circuits. Each block comprises a stacked area of memory cells, where alternating levels of the stack represent word lines. While two blocks are depicted as an example, additional blocks can be used, extending in the x- and/or y-directions.

In one example implementation, the length of the plane in the x-direction, represents a direction in which signal paths for word lines extend (a word line or SGD line direction), and the width of the plane in the y-direction, represents a direction in which signal paths for bit lines extend (a bit line direction). The z-direction represents a height of the memory device.

FIG. 1C is a functional block diagram of an example memory system such as the 3D stacked non-volatile memory system 100 of FIG. 1B. The components depicted in FIG. 1C are electrical circuits. Memory system 100 includes one or more memory die 108. Each memory die 108 includes a three dimensional memory structure 126 of memory cells (such as, for example, a 3D array of memory cells), control circuitry 110, and read/write circuits 128. In other embodiments, a two dimensional array of memory cells can be used. Memory structure 126 is addressable by word lines via a row decoder 124 and by bit lines via a column decoder 132. The read/write circuits 128 include multiple sense blocks 150 including SB1, SB2, . . . , SBp (sensing circuitry) and allow a page of memory cells to be read or programmed in parallel. In some systems, a controller 122 is included in the same memory system 100 (e.g., a removable storage card) as the one or more memory die 108. However, in other systems, the controller can be separated from the memory die 108. In some embodiments controller 122 will be on a different die than memory die 108. In some embodiments, one controller 122 will communicate with multiple memory die 108. In other embodiments, each memory die 108 has its own controller. Commands and data are transferred between the host 140 and controller 122 via communication interface (e.g., data bus) 120, and between memory controller 122 and the one or more memory die 108 via lines 118. In one embodiment, memory die 108 includes a set of input and/or output (I/O) pins that connect to lines 118.

Multiple memory elements in memory structure 126 may be configured so that they are connected in series or so that each element is individually accessible. By way of non-limiting example, flash memory systems in a NAND configuration (NAND memory) typically contain memory elements connected in series. A NAND string is an example of a set of series-connected transistors comprising memory cells and select gate transistors.

A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are exemplary, and memory elements may be otherwise configured.

Other types of non-volatile memory in addition to NAND flash memory can also be used. Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), phase change memory (e.g., PCRAM), and other semiconductor elements capable of storing information. Each type of memory device may have different configurations. For example, flash memory devices may be configured in a NAND or a NOR configuration.

The memory elements can be formed from passive and/or active elements, in any combination. By way of non-limiting example, passive semiconductor memory elements include ReRAM device elements, which in some embodiments include a resistivity switching storage element, such as an anti-fuse or phase change material, and optionally a steering element, such as a diode or transistor. The phase change material may include a chalcogenide material. Further by way of non-limiting example, active semiconductor memory elements include EEPROM and flash memory device elements, which in some embodiments include elements containing a charge storage region, such as a floating gate, conductive nanoparticles, or a charge storage dielectric material.

The memory structure 126 can be two-dimensional (2D) or three-dimensional (3D). The memory structure 126 may comprise one or more arrays of memory elements (also referred to as memory cells). In a two-dimensional memory structure, the semiconductor memory elements are arranged in a single plane or a single memory device level. Typically, in a two-dimensional memory structure, memory elements are arranged in a plane (e.g., in an x-y direction plane) which extends substantially parallel to a major surface of a substrate that supports the memory elements. The substrate may be a wafer over or in which the layer of the memory elements is formed or it may be a carrier substrate which is attached to the memory elements after they are formed. As a non-limiting example, the substrate may include a semiconductor such as silicon.

A three-dimensional memory array is arranged so that memory elements occupy multiple planes or multiple memory device levels, thereby forming a structure in three dimensions (i.e., in the x, y and z directions, where the z direction is substantially perpendicular and the x and y directions are substantially parallel to the major surface of the substrate).

The memory structure may comprise a monolithic three-dimensional memory structure in which multiple memory levels are formed above (and not in) a single substrate, such as a wafer, with no intervening substrates. The memory structure may comprise any type of non-volatile memory that is monolithically formed in one or more physical levels of arrays of memory cells having an active area disposed above a silicon substrate. The memory structure may be in a non-volatile memory device having circuitry associated with the operation of the memory cells, whether the associated circuitry is above or within the substrate.

Typically, in a monolithic three-dimensional memory array, one or more memory device levels are formed above a single substrate. Optionally, the monolithic three-dimensional memory array may also have one or more memory layers at least partially within the single substrate. As a non-limiting example, the substrate may include a semiconductor such as silicon. In a monolithic three-dimensional array, the layers constituting each memory device level of the array are typically formed on the layers of the underlying memory device levels of the array. However, layers of adjacent memory device levels of a monolithic three-dimensional memory array may be shared or have intervening layers between memory device levels.

As a non-limiting example, a three-dimensional memory structure may be vertically arranged as a stack of multiple two-dimensional memory device levels. As another non-limiting example, a three-dimensional memory array may be arranged as multiple vertical columns (e.g., columns extending substantially perpendicular to the major surface of the substrate, i.e., in the y direction) with each column having multiple memory elements. The columns may be arranged in a two-dimensional configuration, e.g., in an x-y plane, resulting in a three-dimensional arrangement of memory elements with elements on multiple vertically stacked memory planes. Other configurations of memory elements in three dimensions can also constitute a three-dimensional memory array.

By way of non-limiting example, in a three-dimensional NAND memory array, the memory elements may be coupled together to form a NAND string within a single horizontal (e.g., x-y) memory device level. Alternatively, the memory elements may be coupled together to form a vertical NAND string that traverses across multiple horizontal memory device levels. Other three-dimensional configurations can be envisioned wherein some NAND strings contain memory elements in a single memory level while other strings contain memory elements which span through multiple memory levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three-dimensional memory arrays. Further, multiple two-dimensional memory arrays or three-dimensional memory arrays (monolithic or non-monolithic) may be formed on separate chips and then packaged together to form a stacked-chip memory device.

One of skill in the art will recognize that this technology is not limited to the two dimensional and three dimensional exemplary structures described but covers all relevant memory structures within the spirit and scope of the technology as described herein and as understood by one of skill in the art.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a memory controller for memory read-write operations may be located on a separate controller chip and/or on the same substrate as the memory elements.

The control circuitry 110 cooperates with the read/write circuits 128 to perform memory operations on the memory structure 126, and includes a state machine 112, an on-chip address decoder 114, and a power control module 116. The state machine 112 provides chip-level control of memory operations. A storage region 113 may be provided for parameters for operating the memory device such as programming parameters for different rows or other groups of memory cells. These programming parameters could include bit line voltages and verify voltages.

The on-chip address decoder 114 provides an address interface between that used by the host or a memory controller to the hardware address used by the decoders 124 and 132. The power control module 116 controls the power and voltages supplied to the word lines and bit lines during memory operations. It can include drivers for word line layers (WLLs) in a 3D configuration, SGS and SGD select gates and source lines. The sense blocks can include bit line drivers, in one approach. A source side select gate (SGS) is a gate transistor at a source-end of a NAND string, and a drain side select gate (SGD) is a transistor at a drain-end of a NAND string.

In some implementations, some of the components can be combined. In various designs, one or more of the components (alone or in combination), other than memory structure 126, can be thought of as one or more control circuits which are configured to perform the actions described herein. For example, one or more control circuits may include any one of, or a combination of, control circuitry 110, state machine 112, decoders 114/124/132, power control module 116, sense blocks SB1, SB2, . . . , SBp, read/write circuits 128, memory controller 122, processor 122c, and so forth.

The memory controller 122 may comprise a processor 122c and storage devices (memory) such as read only memory (ROM) 122a and RAM 122b. RAM 122b may be, but is not limited to, SRAM and DRAM. The storage devices comprise code such as a set of instructions, and the processor is operable to execute the set of instructions to provide the functionality described herein. Alternatively or additionally, the processor can access code from a storage device region 126a of the memory structure, such as a reserved area of memory cells in one or more word lines.

The code is used by the memory controller 122 to access the memory structure 126 such as for programming, read and erase operations. The code can include boot code and control code (e.g., a set of instructions). The boot code is software that initializes the memory controller during a booting or startup process and enables the memory controller to access the memory structure. The code can be used by the memory controller to control one or more memory structures. Upon being powered up, the processor 122c fetches the boot code from the ROM 122a or storage device region 126a for execution, and the boot code initializes the system components and loads the control code into the RAM 122b. Once the control code is loaded into the RAM 122b, it is executed by the processor 122c. The control code includes drivers to perform basic tasks such as controlling and allocating memory, prioritizing the processing of instructions, and controlling input and output ports.

Any one or any combination of control circuitry 110, state machine 112, decoders 114/124/132, power control module 116, sense blocks 150, read/write circuits 128, memory controller 122, processor 122c, and/or interface 122d can be considered one or more control circuits that performs the functions described herein.

A person of ordinary skill in the art will recognize that the technology described herein is not limited to a single specific memory structure, but covers many relevant memory structures within the spirit and scope of the technology as described herein and as understood by one of ordinary skill in the art.

FIG. 2 is a block diagram of example memory system 100, depicting more details of one embodiment of memory controller 122. As used herein, a memory controller is a device that manages data stored on memory and communicates with a host, such as a computer or electronic device. In one embodiment, the memory controller is a flash memory controller. However, the memory controller is not limited to flash memory controller. For example, the non-volatile memory in the memory die 108 may contain phase change memory. A memory controller can have various functionality in addition to the specific functionality described herein. For example, the memory controller can format the memory to ensure the memory is operating properly, map out bad memory cells, and allocate spare memory cells to be substituted for future failed cells. Some part of the spare cells can be used to hold firmware to operate the memory controller and implement other features. In operation, when a host needs to read data from or write data to the memory, it will communicate with the memory controller. If the host provides a logical address to which data is to be read/written, the memory controller can convert the logical address received from the host to a physical address in the flash memory. (Alternatively, the host can provide the physical address). The memory controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused).

The interface between memory controller 122 and non-volatile memory die 108 may be any suitable memory interface, such as Toggle Mode 200, 400, or 800 in a flash memory interface. In one embodiment, memory system 100 may be a card based system, such as a secure digital (SD) or a micro secure digital (micro-SD) card. In an alternate embodiment, memory system 100 may be part of an embedded memory system. For example, the memory may be embedded within the host. In other example, memory system 100 can be in the form of a solid state drive (SSD) drive.

In some embodiments, non-volatile memory system 100 includes a single channel between memory controller 122 and non-volatile memory die 108, the subject matter described herein is not limited to having a single memory channel. For example, in some memory system architectures, 2, 4, 8 or more channels may exist between the controller and the memory die, depending on controller capabilities. In any of the embodiments described herein, more than a single channel may exist between the controller and the memory die, even if a single channel is shown in the drawings.

As depicted in FIG. 2, memory controller 122 includes a front end module 208 that interfaces with a host, a back end module 210 that interfaces with the one or more non-volatile memory die 108, and various other modules that perform functions which will now be described in detail.

The components of memory controller 122 depicted in FIG. 2 may take the form of a packaged functional hardware unit (e.g., an electrical circuit) designed for use with other components, a portion of a program code (e.g., software or firmware) executable by a (micro) processor or processing circuitry that usually performs a particular function of related functions, or a self-contained hardware or software component that interfaces with a larger system, for example. For example, each module may include an application specific integrated circuit (ASIC), a Field Programmable Gate Array (FPGA), a circuit, a digital logic circuit, an analog circuit, a combination of discrete circuits, gates, or any other type of hardware or combination thereof. Alternatively or in addition, each module may include software stored in a processor readable device (e.g., memory) to program a processor for memory controller 122 to perform the functions described herein. The architecture depicted in FIG. 2 is one example implementation that may (or may not) use the components of memory controller 122 depicted in FIG. 1A or 1C (i.e. RAM 122b, ROM 122a, processor 122c, interface 122d).

Referring again to modules of the memory controller 122, a buffer manager/bus control 214 manages buffers in random access memory (RAM) 216 and controls the internal bus arbitration of memory controller 122. A read only memory (ROM) 218 stores system boot code. Although illustrated in FIG. 2 as located separately from the memory controller 122, in other embodiments one or both of the RAM 216 and ROM 218 may be located within the controller. In yet other embodiments, portions of RAM and ROM may be located both within the memory controller 122 and outside the controller. Further, in some implementations, the memory controller 122, RAM 216, and ROM 218 may be located on separate semiconductor die.

Front end module 208 includes a host interface 220 and a physical layer interface (PHY) 222 that provide the electrical interface with the host or next level storage controller. The choice of the type of host interface 220 can depend on the type of memory being used. Examples of host interfaces 220 include, but are not limited to, Serial Advanced Technology Attachment (SATA), SATA Express, Serial Attached SCSI (SAS), Fibre Channel, Universal Serial Bus (USB), Peripheral Computer Interconnect express (PCIe), and Non-volatile Memory Express (NVMe). The host interface 220 typically facilitates transfer for data, control signals, and timing signals.

Back end module 210 includes an error correction code (ECC) engine 224 that encodes the data bytes received from the host, and decodes and error corrects the data bytes read from the non-volatile memory. A command sequencer 226 generates command sequences, such as program and erase command sequences, to be transmitted to non-volatile memory die 108. A RAID (Redundant Array of Independent Dies) module 228 manages generation of RAID parity and recovery of failed data. The RAID parity may be used as an additional level of integrity protection for the data being written into the non-volatile memory system 100. In some cases, the RAID module 228 may be a part of the ECC engine 224. Note that the RAID parity may be added as an extra die or dies as implied by the common name, but it may also be added within the existing die, e.g. as an extra plane, or extra block, or extra WLs within a block. A memory interface 230 provides the command sequences to non-volatile memory die 108 and receives status information from non-volatile memory die 108. In one embodiment, memory interface 230 may be a double data rate (DDR) interface, such as a Toggle Mode 200, 400, or 800 interface. A non-volatile memory (NVM) control layer 232 controls the overall operation of back end module 210. In one embodiment, NVM control layer 232 is a flash control layer.

Additional components of system 100 illustrated in FIG. 2 include media management layer 238, which performs wear leveling of memory cells of non-volatile memory die 108. System 100 also includes other discrete components 240, such as external electrical interfaces, external RAM, resistors, capacitors, or other components that may interface with memory controller 122. In alternative embodiments, one or more of the physical layer interface 222, RAID module 228, media management layer 238 and buffer management/bus controller 214 are optional components that are not necessary in the memory controller 122.

The MML 238 has physical address predictor 250, which may be used to predict a physical address associated with a logical address. The physical address may be one that is predicted to follow a sequence of random logical addresses. For example, the physical address could be associated with a logical address that is expected to follow the random logical addresses. The predicted physical address might be the physical location on one of the memory die 108 at which host data 50 for the logical address is stored. The predicted physical address might be the physical location in a management table 60 on one of the memory die 108, wherein the location of the host data for the logical address may ultimately be obtained from the management table 60.

The MML 238 also includes a physical address validator 260, which may be used to validate the predicted physical address. For example, the physical address validator 260 may determine whether the information that is stored at the predicted physical address may be used to provide host data for the logical address. As one example, the physical address validator 260 may determine whether the data that was read at the predicted address is the host data for the logical address. As another example, the physical address validator 260 may determine whether a predicted address in a management table 60 may be used to ultimately locate the host data for the logical address.

The Media Management Layer (MML) 238 (which in one embodiment is a Flash Translation Layer (FTL)) may be integrated as part of the memory cell management that may handle memory cell errors and interfacing with the host. For example, MML may be a module in flash management and may be responsible for the internals of NAND management. In particular, the MML 238 may include an algorithm in the memory device firmware which translates writes from the host into writes to the memory structure 126 of die 108. The MML 238 may be needed because: 1) the memory may have limited endurance; 2) the memory structure 126 may only be written in multiples of ECC pages; and/or 3) the memory structure 126 may not be written unless it is erased as a block. The MML 238 understands these potential limitations of the memory structure 126 which may not be visible to the host. Accordingly, the MML 238 attempts to translate the writes from host into writes into the memory structure 126.

Memory controller 122 may interface with one or more memory dies 108. In one embodiment, memory controller 122 and multiple memory dies (together comprising non-volatile memory system 100) implement a solid state drive (SSD), which can emulate, replace or be used instead of a hard disk drive inside a host, as a Network Attached Storage (NAS) device, laptop, tablet, etc. Additionally, the SSD need not be made to work as a hard drive.

Figure 3:
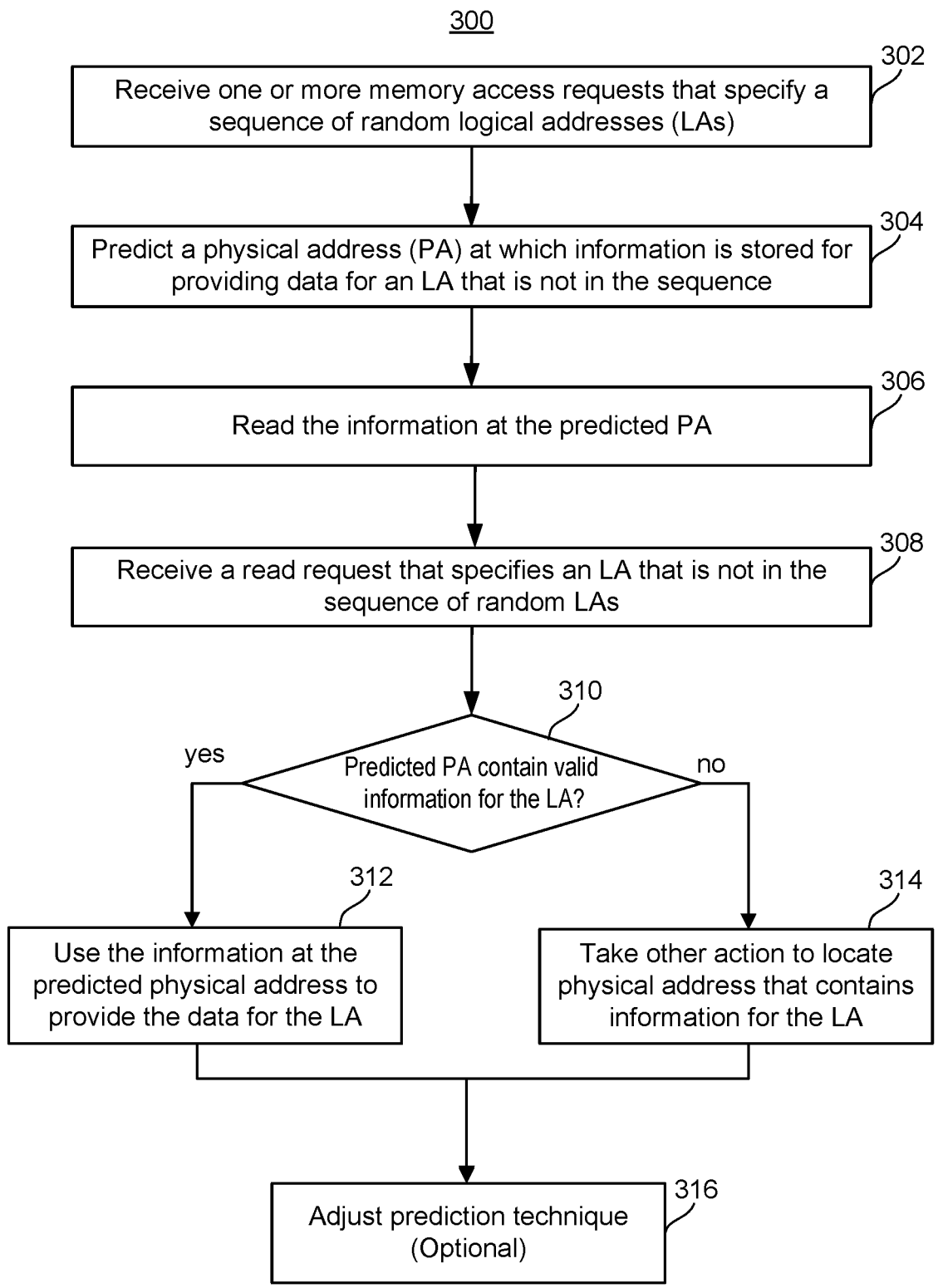
FIG. 3 is a flowchart of one embodiment of a process of operating non-volatile storage.

FIG. 3 is a flowchart of one embodiment of a process 300 of operating non-volatile storage. The process 300 may be used to predict a physical address for a logical address. For example, the process may predict a physical address for a logical address in a read request. The physical address could be a prediction of a location in memory structure 126 of a memory die 108 at which the host data for the logical address in the read request is stored. The physical address could be a prediction of a location in management table 60 in memory structure 126 of a memory die 108 at which there is information that may be used to obtain the location of the host data for the logical address in the read request. Note that the read request is not necessarily received by the memory system 100 when the prediction is made. Hence, the process 300 can save considerable time and/or power when responding to a read request from host 140.

The process 300 may be used in a memory system 100 such as, but not limited to, the memory systems 100 in FIG. 1A, 1B, 1C, or 2. The process 300 may be performed by one or more control circuits in the memory system 100. The one or more control circuits may include one or more of processor 122c, interface 122d, control circuitry 110, decoders 124/132, and read/write circuits 128. In one embodiment, memory controller 122 performs various steps in process 300, including sending commands to the memory dies 108, which contain circuitry for accessing memory structure 126.

Step 302 includes the memory controller 122 receiving one or more memory access requests that specify a sequence of random logical addresses (e.g., LBAs). By a sequence of "random" logical addresses it is meant that the logical addresses are not all consecutive. The logical addresses may be referred to as host logical addresses, in some embodiments. The sequence of "random" logical addresses may be in a sequence of memory access requests from the host 140. The sequence of memory access requests may include read requests and/or write requests. Each memory access request (e.g., read request, write request) may specify a logical address (e.g., LBA) and logical address range (e.g., LBA range).

Step 304 includes the memory controller 122 predicting a physical address (e.g., PBA) at which information for providing data for a logical address that is not in the sequence of random logical addresses is stored. In one embodiment, the memory controller 122 predicts a physical address for a logical address that the memory controller 122 expects will follow the sequence of random logical addresses. The logical address that is expected to follows the sequence will be referred to herein as a "following logical address." In one embodiment, the following logical address is specified in a memory access request that is received by the memory controller 122 from the host system 140 after the memory controller 122 receives the one or more memory access requests in step 302.

The predicted physical address may be a physical address in the memory structure 126 at which host data 50 for the logical address is stored. The predicted physical address may be a physical address in the memory structure 126 at which a portion of the management table 60 is stored. Note that information in the management table 60 may be used to respond to the read request. For example, information in the management table 60 may be used to determine a physical address in memory structure 126 at which host data for the following logical address is stored. The physical address is not limited to these examples.

Numerous techniques may be used to predict the physical address. In one embodiment, the sequence of random logical addresses is compared to stored patterns of logical addresses to look for a matching pattern. There is at least one physical address stored for each stored pattern, which represents a prediction of the physical address to follow the sequence. In some cases, there will be physical addresses associated with logical addresses in the stored pattern, which may also be used to predict physical addresses. Further details of embodiments of pattern matching are discussed below in the discussion of FIGS. 4B, 6A, and 6B.

In one embodiment, a model such as a hidden Markoff model is trained based on past patterns of random logical addresses and their corresponding physical addresses in the non-volatile memory in memory structure 126. The model could be trained offline or online. Step 304 may include using the trained model to predict a physical address for the logical address in the read request. This may include inputting the sequence of random logical addresses into the model, which may output a predicted physical address for the next logical address in the sequence. Further details of embodiments of the trained model are discussed below in the discussion of FIGS. 4C, 6C, and 6D.

Step 306 includes reading information at the predicted physical address. Step 306 may include perform a read of host data 50 in the memory structure 126. Note that a read of host data 50 will be referred to herein as a "data read." Step 306 may include performing a read of a portion of a management table 60 in the memory structure. Note that a read of a portion of a management table 60 will be referred to herein as a "control read."

In the event that the predicted physical address is in the management table 60, then step 306 may also include using information in the management table 60 to perform another read. For example, read of the management table 60 might yield a physical address of host data 50, where the data for the following logical address is stored. As will be discussed below, the read of the management table 60 might yield a physical address of a lower level of the management table 60. Then, the lower level of the management table 60 may be read to yield the physical address at which the host data is stored. The management table 60 might contain more than two levels. Thus, note that step 306 may include returning host data 50 from memory structure 126 even when the predicted physical address is for a control read.

Step 308 includes receiving a read request that specifies a logical address at which to read. The read request may specify a logical address that is not in the sequence of random logical addresses from step 302. Note that step 308 is depicted at this location in the process 300 as a matter of convenience of explanation. The read request could be received earlier or later in the process 300. In one embodiment, the read request is received by the memory controller 122 after the one or more read requests of step 302, in which case the read request contains a "following logical address."

Step 310 includes a determination of whether the information read at the predicted physical address is valid for providing data for the logical address in the read request (from step 308). In some embodiments, when the memory controller stores a chunk of data for a logical address, it stores the logical address with the chunk. For example, the LBA may be stored with a block of data in memory structure 126. Thus, the memory controller 122 may compare the LBA from a block of data read in step 306 with an LBA specified by the read request from step 308 to verify whether the PBA is valid for the LBA specified by the read request.

Note that in some cases, the predicted physical address is for a control read of the management table 60. As noted above, the information in the management table 60 may be used to eventually make a read of a block of host data. In this case, the LBA in the block may be compared with the LBA specified by the read request to verify whether the predicted physical address for the control read of the management table 60 was valid. Also, in some cases, the portion of the management table 60 that is read may contain metadata that indicates the LBAs for that portion of the management table 60. Hence, this metadata may be used to verify whether the predicted physical address for the control read of the management table 60 was valid.

If the predicted physical address was valid, then the information that was read at the predicted physical address (in step 306) is used to provide host data for the logical address in the read request (of step 308) to the host system 140. Note that the "use of the information" at the predicted physical address may include performing ECC on data read from memory structure 126 in the event that the predicted physical address was for a data read. Note that the "use of the information" at the predicted physical address may include using information in a control entry of a management table 60 to eventually locate the host data 50 for the logical address in the read request (of step 308) in memory structure.

If the predicted physical address is not valid (step 310=no), then another action may be performed in step 314 to provide the data for the read request (of step 308) to the host 140. One technique is to use a different physical address that is predicted by the memory controller 122 based on the sequence of random logical address of step 302. Another technique is to not rely upon a predicted physical address. For example, rather than relying on a predicted physical address, the memory controller 122 may perform one or more control reads of the management table 60 to determine the physical address at which the host data for the read request of step 308 is stored.

Step 316 is an optional step of adjusting a physical address prediction technique based on the results of step 312 and/or 314. For example, if the memory system 100 stored patterns of logical addresses, with associated physical address, one of more of these patterns may be updated. For example, the results of steps 312 and/or 314 may indicate that the physical address predictor 250 should be updated to predict the physical address in the memory structure 126 that was eventually found to contain the data for the logical address specified by the read request of step 308 in response to the sequence from step 302. In one embodiment, the patterns are characterized as "hot" or "cold" based on how frequently they were matched in step 304, for example. Cold patterns (e.g., not frequently matched) may be removed from volatile memory to conserve space.

Figure 4A:
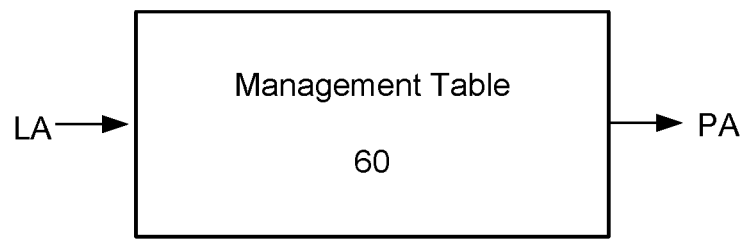
FIG. 4A depicts one technique for which a physical address (PA) can be determined for a logical address (LA).
Figure 5:
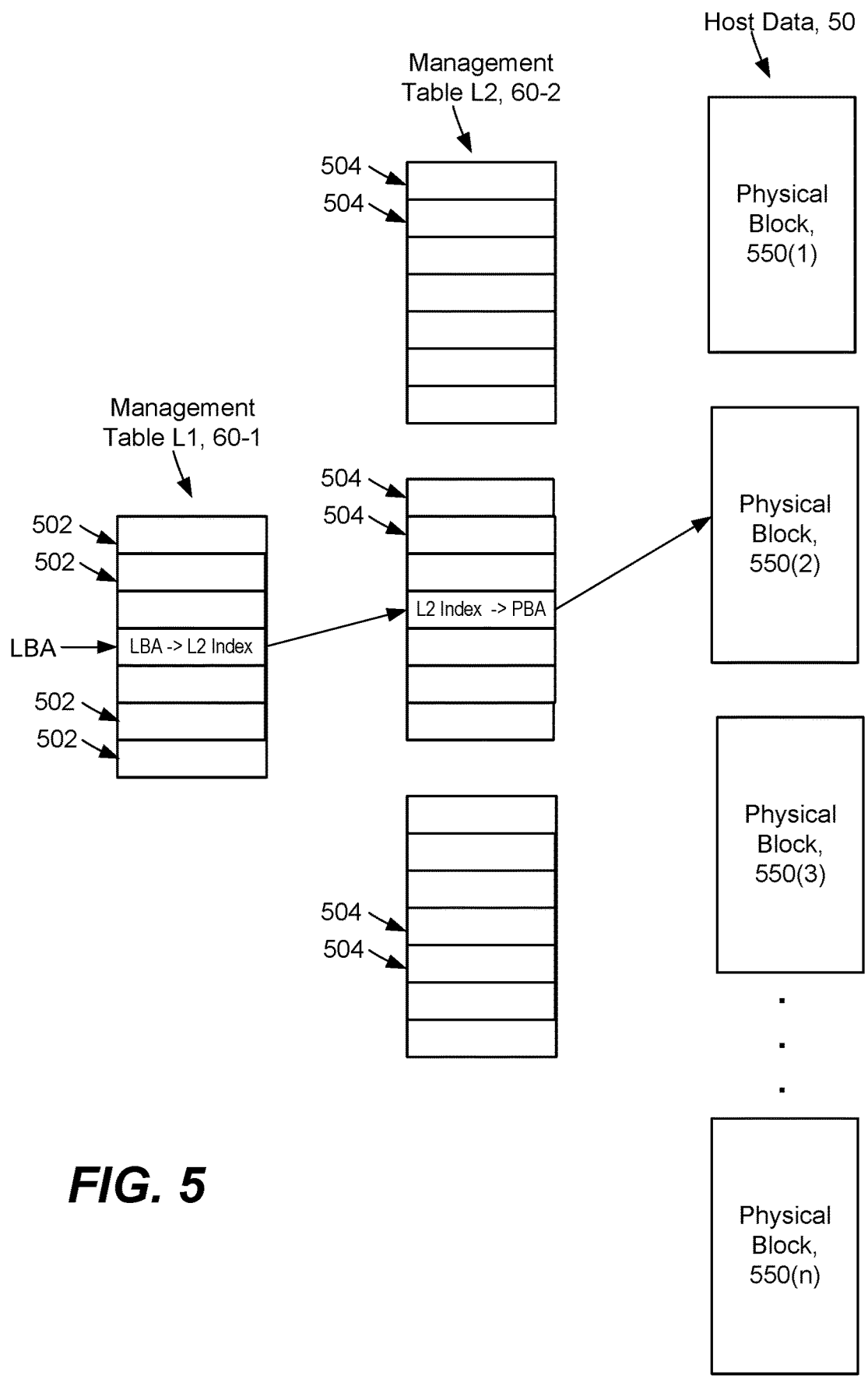
FIG. 5 depicts one example of a hierarchical organization of a management table, along with a portion of host data.

FIG. 4A depicts one technique for which a physical address (PA) can be determined for a logical address (LA). For example, a PBA may be determined for an LBA. The management table 60 may be stored in the non-volatile memory in memory structure 126. Portions of the management table 60 could be cached in RAM 122b. The technique may require one or more control reads of the management table 60 in order to determine the PBA. Each of these control reads could be time and/or power consuming, as each control read may require a read of non-volatile memory in memory structure 126. Further details of one embodiment of hierarchical management table 60 are depicted in FIG. 5.

Figure 4B:
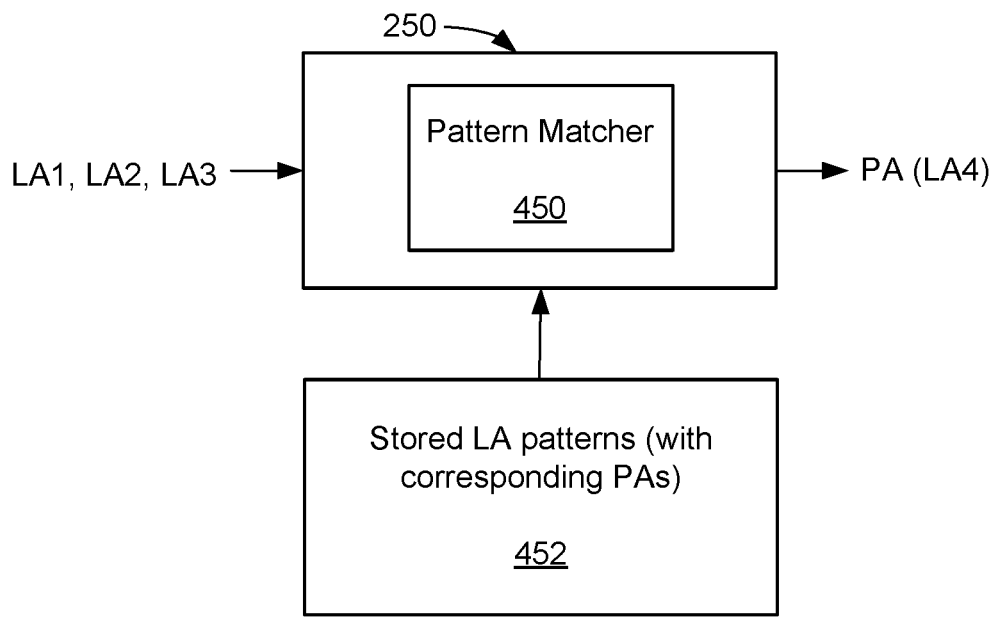
FIG. 4B depicts one embodiment of a physical address predictor that has a pattern matcher.

FIG. 4B depicts one embodiment of a physical address predictor 250 that has a pattern matcher 450. The physical address predictor 250 with pattern matcher 450 is used in one embodiment of step 304 of process 300. The physical address predictor 250 may be used as an alternative to the technique of FIG. 4A, or in combination with the technique of FIG. 4A. In one embodiment, the physical address predictor inputs a sequence of logical addresses (e.g., LBAs) and predicts at least one physical address (e.g., PBA). The sequence of logical addresses may be random logical addresses. The prediction may be for a physical address that is predicted to be useful for providing host data for a logical address that not in the input sequence (such as a following logical address).

The sequence of logical addresses includes LA1, LA2, and LA3, in the example of FIG. 4B. These may be random logical addresses. Note that these random logical addresses may be followed by LA4, but LA4 is not yet available to the physical address predictor 250. LA4 is an example of a "following logical address" as it follows the sequence LA1, LA2, LA3. The physical address predictor 250 predicts a physical address for LA4, in one embodiment. Note that the physical address predictor 250 may also predict physical addresses for LA1, LA2, and LA3.

The pattern matcher 450 may use stored patterns 452 of logical addresses to predict the physical address, in one embodiment. Each of the stored patterns 452 contains a sequence of logical addresses. One example way of storing a pattern 452 is to store a sequence of nodes. Each node may contain a logical address (e.g., LBA) and a length (e.g., number of blocks). Each node may also specify a physical address (e.g., PBA) for each logical address. Moreover, there may be one or more nodes in the pattern 452 that specify a physical address, without an associated logical address. For example, the pattern 452 could end with one or more nodes that specify physical addresses that are expected to follow the sequence of logical addresses in the previous nodes.

There could be any number of stored patterns 452 of logical address sequences (e.g., tens of sequences, hundreds of sequences). In one embodiment, the pattern matcher 450 looks for a good match for the input sequence (e.g., LA1, LA2, LA3) among the stored patterns 452. For example, the pattern matcher 450 may select a subset of a stored pattern that is a good match for the input sequence. Note that a "subset" of a stored pattern 452 of logical addresses, as defined herein, includes the entire pattern 452 of logical addresses, as well as fewer than all logical addresses in the stored pattern. The subset is a contiguous portion of the pattern 452 in one embodiment. For example, the pattern matcher 450 may determine that "n" contiguous nodes of the pattern 452 are a good match for the input sequence. The pattern matcher 450 may determine a subset of contiguous logical addresses in a given node are a good match for a subset of the input sequence.

If the pattern matcher 450 finds a subset of a stored pattern 452 that matches with sufficient reliability, then the physical address predictor 250 predicts the physical address based on the subset of the stored pattern. A subset of a stored pattern 452 that matches with sufficient reliability will be referred to as a "matching subset." As one example, the physical address predictor 250 might select a physical address that is in a node that follows the matching subset. Thus, the physical address predictor 250 may predict a physical address for a logical address that is expected to follow the input sequence of random logical addresses. In one embodiment, the pattern matcher 450 generates a score that is indicative of a level of similarity between the input sequence and the matching subset.

The physical address predictor 250 may assign a probability with each predicted physical address. The probability is the likelihood that the physical address is valid for obtaining the data for a logical address (e.g., following logical address) that is not in the input sequence of random logical addresses, in one embodiment. In some cases, the physical address predictor 250 may predict more than one physical address for the logical address (e.g., following logical address). For example, the physical address predictor 250 might assign a different probability for each of the stored patterns 452. It is not required that the physical address predictor 250 make a prediction for every stored pattern 452.

The predicted physical address might be the physical location in memory structure 126 at which the data for the logical address (e.g., following logical address) is stored. The predicted physical address might be the physical location in memory structure 126 at which a portion of the management table 60 is stored.

Figure 4C:
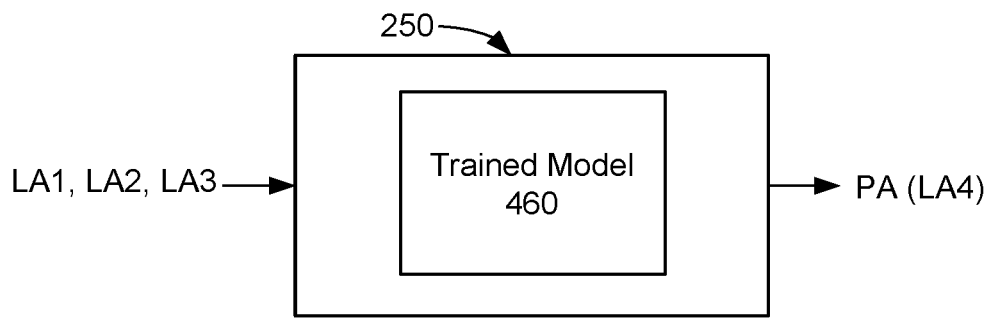
FIG. 4C is an embodiment of a physical address predictor that includes a trained model.

FIG. 4C is an embodiment of a physical address predictor 250 that includes a trained model 460. The physical address predictor 250 with trained model 460 is used in one embodiment of step 304 of process 300. A sequence of logical addresses (e.g., LA1, LA2, LA3) may be input to the trained model 460. These may be random logical addresses. The trained model 460 outputs at least one predicted physical address for the input sequence. For example, the trained model 460 may output a physical address that can be used to obtain information for providing host data to a logical address that follows the input sequence. The physical address predictor 250 predicts a physical address for LA4, in one embodiment.

Note that the physical address predictor 250 may also predict physical addresses for LA1, LA2, and LA3. Note that this allows a physical address to be generated for a logical address without having to access the management table 60 in memory structure 126 (or a LTP cache 36 in RAM 122b). It also allows a physical address to be generated for a logical address without having to access stored patterns 452 of logical addresses (with corresponding physical addresses for the logical addresses in the pattern 452).

In one embodiment, the trained model 460 is a hidden Markoff model (HMM). A hidden Markov model is a statistical Markov model in which the system being modeled is assumed to be a Markov process with unobserved (e.g., hidden) states. In simpler Markov models (such as a Markov chain), the state is directly visible to the observer, and therefore the state transition probabilities are the only parameters. In an HMM, the state is not directly visible. However, the output of an HMM, which is dependent on the state, is visible. Each state in an HMM has a probability distribution over the possible output tokens. Therefore, the sequence of tokens generated by an HMM gives some information about the sequence of states.

The parameter learning task in HMMs is to find, given an output sequence or a set of such sequences, the best set of state transition and emission probabilities. In one embodiment, the emissions or observations of the HMM are the physical addresses (e.g., PBAs). The input to the HMM may be the host memory access request sequences and their logical addresses. For example, the input to the HMM may be a sequence of random logical addresses, which were provided by the host system 140 in read and/or write requests. By using the output sequences of physical addresses and the input sequences of logical addresses, the state transitions which lead to the physical addresses may be estimated. In one embodiment, the Viterbi algorithm is used to estimate the state transitions.

Note that HMM may be trained offline and/or in the field. For example, the memory access requests may be provided by the host system 140 offline such as during a one-time initial configuration of the memory system, e.g., after the memory system has been manufactured but has not yet distributed for sale. The memory access requests may also be performed in the field, as the memory system 100 is processing commands from a host system 140, after the memory system 100 has been distributed. Note that both options can be combined, such that the HMM may be initially trained during the one-time initial configuration, and re-trained in the field.

FIG. 5 depicts one example of a hierarchical organization of a management table 60, along with a portion of host data 50. The management table 60 of FIG. 5 can be used in process 300. For example, process 300 can be used to predict entries in the management table 60, which can save considerable time and/or power when, for example, responding to a read request. The entire management table 60 may be stored in non-volatile memory in memory structure 126. Portions of the management table 60 may be cached in RAM 122*b* for quicker access.

The management table 60 has two levels in this example, but there could be more than two levels. Also, in one embodiment, the management table 60 has only a single level. The first level in FIG. 5 is referred to as management table L1 60-1. There are a number of entries 502 in management table L1 60-1. Each entry contains a pointer, which may be used to locate one entry at the next level of the management table L2 60-2.

The second level is referred to as management table L2 60-2. There are a number of entries 504 in management table L2 60-2. Each entry 504 contains a physical block address (PBA), which may be used to locate one a physical block 550 in which host data 50 is stored.

The following describes one possible technique in which the management table 60 may be used to determine a physical address at which host data for a logical address is stored in non-volatile memory in memory structure 126. A read request from the host 140 may contain a logical block address (LBA), along with a length (in, for example, blocks). For the sake of discussion, processing for a single LBA will be discussed. Based on the LBA, the memory controller 122 will know what portion of the management table L1 60-1 should be read, in one embodiment. For the sake of discussion, the portions of the management table 60 that need to be accessed are not cached in RAM 122*b*. The memory controller issues a read request to one of the memory die 108 to return a portion of the management table L1 60-1. Reading a portion of the management table 60 is referred to herein as a "control read." Based on this first control read, the memory controller 122 determines the L2 index. In one embodiment, there are more potential LBAs than entries 502 in the management table L1 60-1. Thus, the memory controller 122 could use any subset of the bits in the LBA to locate an entry 502, in one embodiment.

Based on the L2 index, the memory controller 122 may issue a second control read. For example, the memory controller 122 may issue a read request to one of the memory die 108 to read a portion of the management table L2 60-2. Based on the second control read, the memory controller 122 determines the PBA of the location of the host data for the LBA. In one embodiment, the memory controller 122 uses the bits of the LBA that were not used to locate the entry 502 in management table L1 60-1 in order to locate the entry 504 in management table L2 60-2.

The memory controller 122 may then issue another read request to one of the memory die, based on the PBA that was learned from the second control read. Herein, this read to obtain the host data is referred to as a "data read." After the memory die 108 returns the data, the memory controller 122 may return the host data to the host 140. Note that the memory controller 122 could process the data, such as performing error correction prior to returning the data to the host 140.

Thus, note that in the foregoing example, there may be a total of three accesses of memory structure 126 (two control reads and one data read) in order to obtain the host data. If the management table 60 has more than two levels, there could be more than two control reads. In some cases, a read of memory structure 126 could be avoided if the data is cached in RAM 122*b*. This could apply to the control read or the data read. However, in many cases, one or more control reads and a data read of in memory structure 126 is needed.

In one embodiment, physical address predictor 250 predicts the final PBA at which the host data is located in non-volatile memory in memory structure 126. This avoids the need to perform the control read of management table L2 60-2. Moreover, this also avoids the control read at the first level of the management table L1 60-1.

In one embodiment, physical address predictor 250 predicts an entry in the management table 60. For example, the physical address predictor 250 may predict that the LBA corresponds to one of the entries 504 in management table L2 60-2. For example, the memory controller 122 might predict that the LBA corresponds to the entry labeled L2 index. The memory controller 122 may read that entry 504 to obtain the PBA. Then, the memory controller may use the PBA to read the host data at that PBA. The foregoing avoids the need of the control read at the first level in management table L1 60-1.

As another example, the physical address predictor 250 may predict that the LBA corresponds to one of the entries 502 in management table L1 60-1. For example, the memory controller 122 might predict that the LBA corresponds to the entry labeled L2 index. The memory controller 122 may read that entry 502 to obtain Index L2. Then, the memory controller may use the Index L2 to read the second level of the management table 60-2 in order to obtain the PBA. Then, the memory controller may use the PBA to read the host data at that PBA. The foregoing avoids the need to know the LBA in order to obtain the L2 index from management table L1 60-1.

Figure 6A:
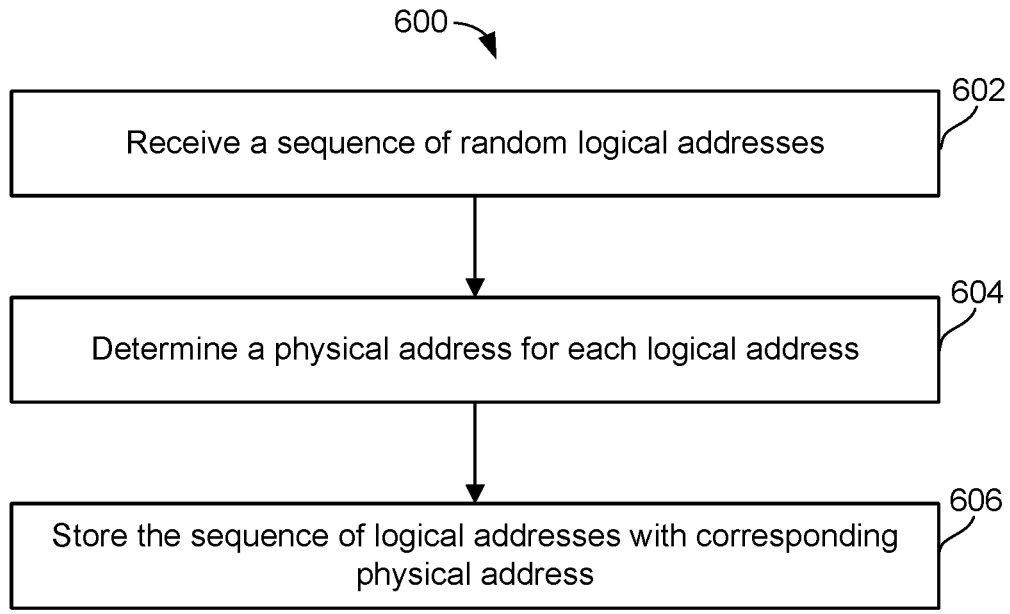
FIG. 6A is a flowchart of one embodiment of a process of storing patterns of logical addresses and their corresponding physical addresses.

FIG. 6A is a flowchart of one embodiment of a process 600 of storing patterns 452 of logical addresses and their corresponding physical addresses. The corresponding physical addresses may be locations in memory structure 126 on memory die 108 at which host data for the logical address is stored. The corresponding physical addresses may be locations (e.g., entries) in management table 60 in memory structure 126 on memory die 108 at which information is stored for locating the host data for the logical address.

The process 600 may be used to build a repository of patterns 452, which may be used in one embodiment of step 304 of process 300 to predict a physical address. The process 600 could be performed offline, such as during a one-time initial configuration of the memory system, e.g., after the memory system has been manufactured but has not yet distributed for sale. The process 600 may also be performed in the field, as the memory system 100 is processing commands from a host 140, after the memory system 100 has been distributed.

Process 600 describes storing a pattern 452 of logical addresses and their corresponding physical addresses. The process 600 may be repeated to store several (or many) such patterns 452. Also, note that the patterns 452 may be updated over time. For example, the patterns may be updated in step 314 of process 300. In one embodiment, the physical addresses are physical locations in host data 50 of in memory structure 126. In one embodiment, the physical addresses are locations in a management table 60 in memory structure 126. For example, the physical locations could be entries 504 at the second level of management table 60-2. As another example, the physical addresses could be entries 502 at the first level of management table 60-1.

Step 602 includes receiving a sequence of random logical addresses. In one embodiment, these are received in memory access requests from host system 140. The memory access requests might be read requests and/or write requests. The memory access requests specify random (or non-consecutive) logical addresses, in one embodiment.

Step 604 includes determining physical addresses to go with the sequence of random logical addresses. Step 604 may include determining a physical address for each logical address in the sequence. If the logical addresses were received in a sequence of write requests, the memory controller 122 might select physical locations in in memory structure 126 at which to store the data, and record the logical addresses and corresponding physical addresses in the management table 60. Thus, these physical locations may be stored with the corresponding logical addresses in the pattern 452. If the logical addresses were received in a sequence of read requests, the memory controller 122 might access the management table 60 to determine a physical address in in memory structure 126 at which the data is stored for each logical address. Again, these physical locations may be stored with the corresponding logical addresses in the pattern 452. In this example, there is one physical address for each logical address, but that is not a requirement. For example, one or more of the logical addresses might not have a physical address stored with it. Also, there might be one or more physical addresses that are stored for unspecified logical addresses that are expected to be received after the sequence.

Note that the physical addresses that correspond to the logical addresses are not required to be the location in memory structure 126 at which the host data 50 for the logical address is stored. The physical addresses could be physical addresses of portions of the management table 60. For example, when the memory controller 122 accesses one or more portions of the management table 60 to convert a logical address to a physical address, the memory controller 122 may note the physical address (e.g., management table entry 502, 504) of a portion of the management table 60 that contains information needed to convert the logical address to physical address of the host data. Thus, note that step 604 may include determining more than one physical address for each logical address. In one embodiment, the management table 60 contains multiple levels in a hierarchical organization, in which case the memory controller 122 may note one physical address (in memory structure 126) for each level.

Step 606 includes storing the pattern 452 of logical addresses with the corresponding physical addresses. As noted, it is not required that there be a physical address stored for each logical address in the pattern. As noted above, there could be more than one physical address for each logical address, such as a physical address for each of several levels in memory structure 126 (such as host data 50, management table L2 60-2, and management table L1 60-1). Also, note that the logical addresses may be stored in a very compact manner. For example, a stored pattern 452 may have a node that specifies a logical address and a length. The pattern may optionally indicate whether the logical address was for a read or a write request.

Figure 6B:
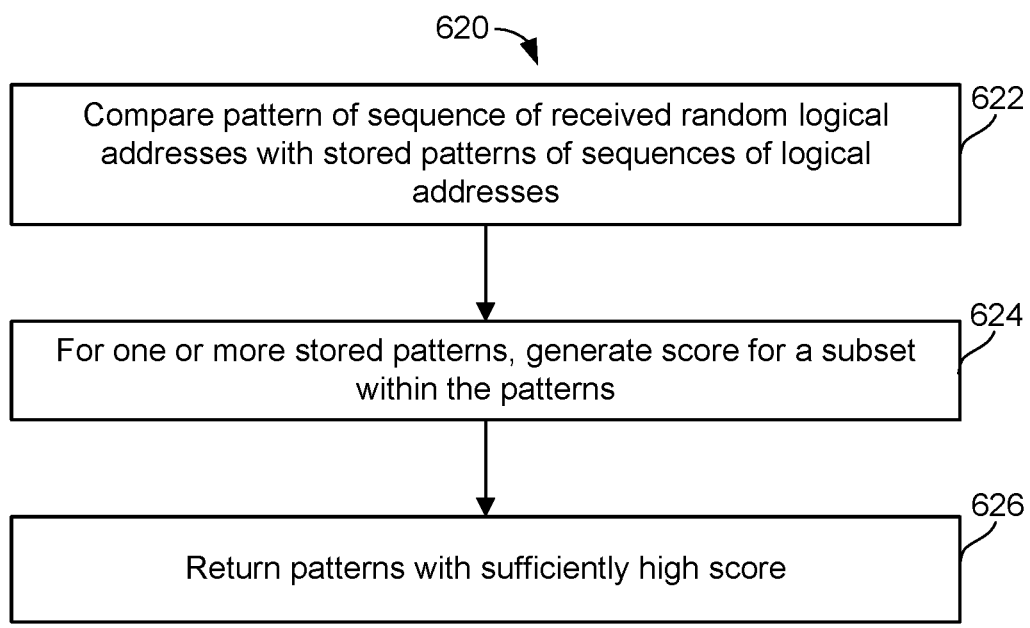
FIG. 6B is a flowchart of one embodiment of a process of predicting a physical address for a logical address, based on pattern matching.

FIG. 6B is a flowchart of one embodiment of a process 620 of predicting a physical address for a logical address, based on pattern matching. Process 620 may use the patterns 452 that were stored in process 600, but is not limited to use with process 600. Process 620 is used in one embodiment of step 304 of process 300. Thus, process 620 may be used to predict a physical address for a logical address that follows a sequence of (e.g., random) logical addresses. In one embodiment, process 620 is performed by physical address predictor 250.

The process 620 may be performed separately for different levels or regions in the memory structure 126. For example, process 620 may be performed separately to predict physical addresses of: 1) host data 50; 2) entries in second level of the management table 60-2; and/or 3) entries in a first level of the management table 60-1, etc.

Step 622 includes comparing a sequence of received random logical addresses (e.g., LBAs) with stored patterns 452 of logical addresses (e.g., LBAs). The sequence of random logical addresses may be received in memory access requests. The memory access requests could include read and/or write requests. Note that step 622 may compare the sequence of received random logical addresses to portions of a given stored pattern 452.

Step 624 includes generating, for one or more stored patterns 452, a score for a subset of the stored pattern 452. Step 624 may generate a separate score for different subsets of the stored pattern. Note that the subset is a contiguous portion of the pattern 452 in one embodiment. The score represents a level of matching between the present sequence of logical addresses and the stored patterns 452 of logical addresses. In one embodiment, the score depends on the percentage of logical addresses that match.

Step 626 includes returning zero or more patterns 452 having a sufficiently high score. Note that each of these patterns 452 has one or more physical addresses stored in association with the logical addresses, such that the associated physical address may be used as a prediction for the physical address for the logical address. In one embodiment, the memory controller 122 determines which of the scores are high enough to have sufficient reliability to warrant reading at the predicted physical address. Note that it may be that none of the patterns 452 has a high enough reliability to warrant reading at the predicted physical address. In some case, there may be more than one pattern 452 having a high enough reliability to warrant reading at the predicted address.

Figure 6C:
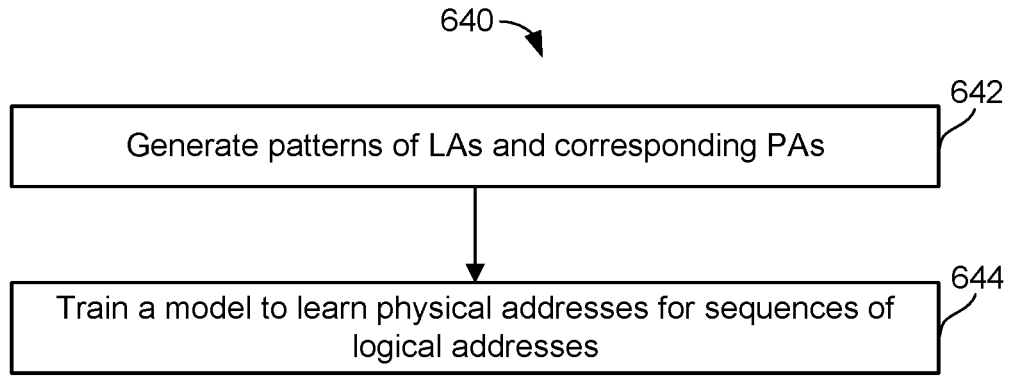
FIG. 6C is a flowchart of one embodiment of a process of training a model to predict physical addresses for a sequence of (e.g., random) logical addresses.

FIG. 6C is a flowchart of one embodiment of a process 640 of training a model to predict physical addresses for a sequence of (e.g., random) logical addresses. The trained model 460 may be used in one embodiment of step 304 of process 300 to predict a physical address. The process 640 could be performed offline, by which it is meant that the process 640 may be performed other than when the memory system 100 is being used in the field. For example, the process 640 could be performed when the memory system 100 is being tested or configured before being shipped for sale to a customer. The process 640 may also be performed in the field.

As noted with respect to process 600, there might be more than one physical address predicted for each logical address. In one embodiment, the physical addresses are physical locations in host data 50 of memory structure 126. In one embodiment, the physical addresses are locations in a management table 60 in memory structure 126. For example, the physical locations could be entries 504 at the second level of management table 60-2. As another example, the physical addresses could be entries 502 at the first level of management table 60-1.

Step 642 includes generating patterns 452 of logical addresses and their corresponding physical addresses. Process 600 may be used to generate such patterns 452.

Step 644 includes training a model 460 to predict a sequence of physical addresses for a sequence of (e.g., random) logical addresses. Step 644 employs machine learning in one embodiment. Step 644 may use a sequence of random logical addresses as input and the corresponding physical addresses as desired output. Note that the model 460 may learn not only what physical address is associated with a given logical address, but may also learn to predict what physical address will follow a sequence of (e.g., random) logical addresses.

In one embodiment, step 644 includes finding parameters for a HMM. Step 644 may include finding the best set of state transition and emission probabilities a given output sequence. In one embodiment, the emissions or observations of the HMM are the physical addresses (e.g., PBAs). The input to the HMM may be the host memory access request sequences and their logical addresses. For example, the input to the HMM may be a sequence of random logical addresses, which were provided by the host system 140 in read and/or write requests. By using the output sequences of physical addresses and the input sequences of logical addresses, the state transitions which lead to the physical addresses may be estimated. In one embodiment, the Viterbi algorithm is used to estimate the state transitions.

Figure 6D:
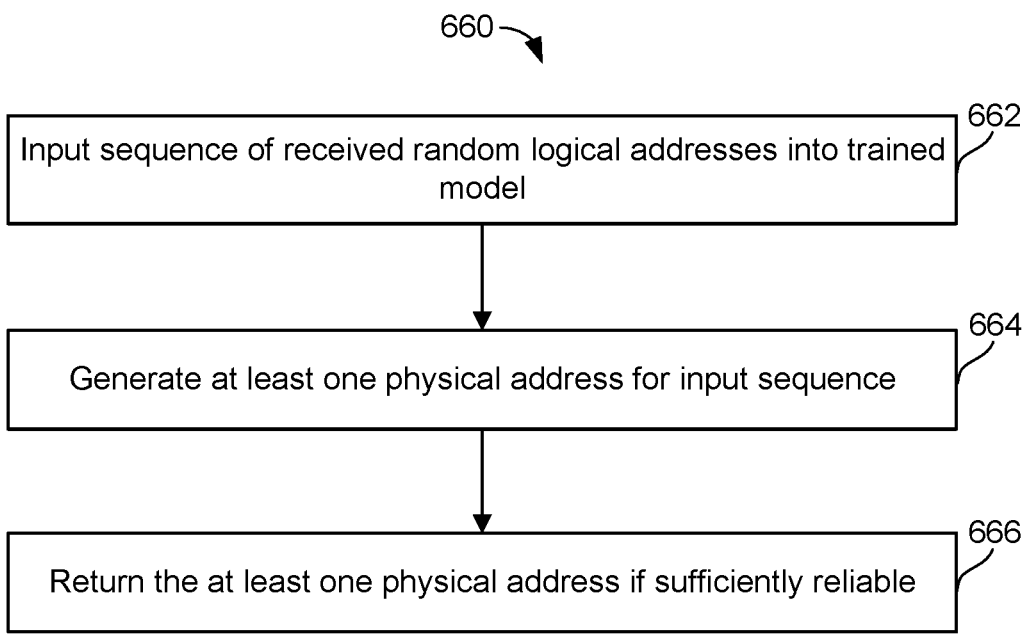
FIG. 6D is a flowchart of one embodiment of a process of predicting a physical address for a logical address, based on a trained model.

FIG. 6D is a flowchart of one embodiment of a process 660 of predicting a physical address for a logical address, based on a trained model 460. Process 660 may use the model that was trained in process 640, but is not limited to use with process 640. Process 660 is used in one embodiment of step 304 of process 300. In one embodiment, process 660 is performed by physical address predictor 250.

The process 660 may be performed separately for different levels in the memory structure 126. For example, process 660 may be performed separately to predict physical addresses in: 1) host data 50; 2) a second level of the management table 60-2; 3) a first level of the management table 60-1, etc.

Step 662 includes inputting a sequence of received random logical addresses (e.g., LBAs) to the model. The sequence of logical addresses may be received in memory access requests from host 140. The memory access requests could include read and/or write requests.

Step 664 includes generating at least one physical address by running the trained model 460. Step 644 may include inputting a sequence of random logical address from the host system 140 to a trained model 460 to predict a physical address. The predicted physical address may be for one of the random logical addresses in the sequence. For example, the trained model 460 may predict a physical address in memory structure 126 at which data for one of the random logical addresses is stored. The predicted physical address might also be used for a control read of management table 60.

Note that in one embodiment, at least one physical address is generated in step 644 for a logical address that is not specified in the input sequence of random logical addresses. This prediction may be a physical address in memory structure 126 for a following logical address (e.g., a logical address that is expected to follow the sequence). The physical address may be used for a data read or a control read.

Step 666 includes returning at least one physical addresses if it has sufficient reliability. In one embodiment, an indication of the reliability of the physical addresses is also returned in step 666. Thus, note that the trained model 460 is able to calculate the reliability of the physical addresses that it generates, in one embodiment.

Figure 7:
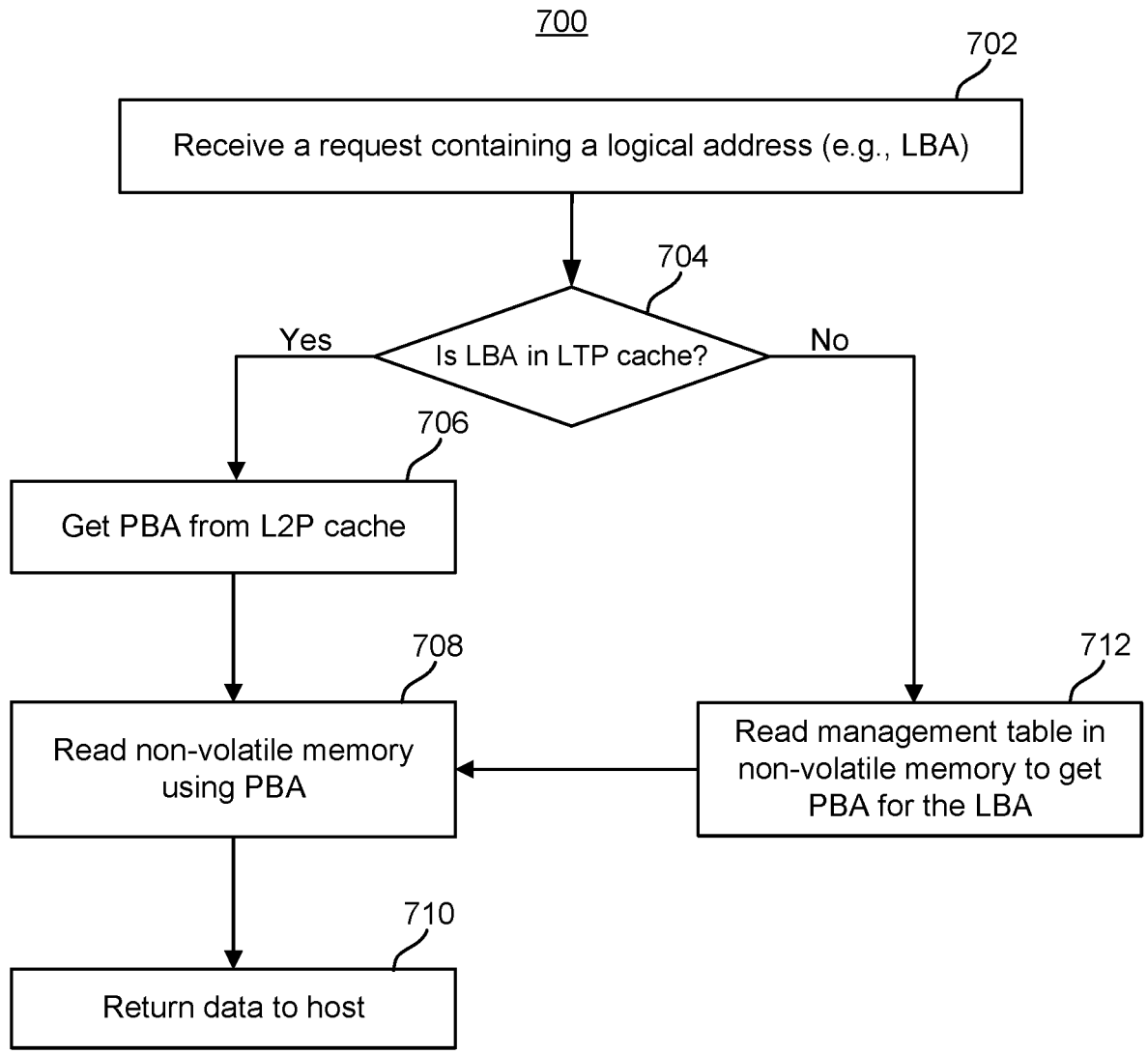
FIG. 7 is a flowchart of one embodiment of a process of providing data for a read request to a host.

FIG. 7 is a flowchart of one embodiment of a process 700 of providing data for a read request to a host 140. In the process 700, the memory controller 122 does not use a prediction of a physical address in order to return data for a read request to the host 140. Process 700 may be used as an alternative to using a predicted physical address to return host data to a host. In one embodiment, process 700 is used in step 312 of process 300. Process 700 will be referred to as a "non-predictive path."

Step 702 includes receiving a read request having a logical address (e.g., LBA). Note that this read request may be at the end of a sequence of memory requests having random logical addresses.

Step 704 includes whether the logical address is in an L2P cache 36 in RAM 122b. If the logical address in in the L2P cache 36, then control passes to step 706. In step 706, the PBA for the LBA is obtained from the L2P cache 36. In step 708, the PBA is used to read host data 50 from the memory structure 126. In step 710, the memory controller 122 returns the host data to the host 140.

If the LBA is not in the L2P cache 36, then control passes to step 712. Step 712 includes accessing the management table 60 in memory structure 126 to obtain the PBA for the LBA. Step 712 may include performing one or more control reads. After the PBA has been obtained, control passes to step 708. Step 708 includes using the PBA to read host data from the memory structure 126. In step 710, the memory controller 122 returns the host data to the host 140.

Figure 8:
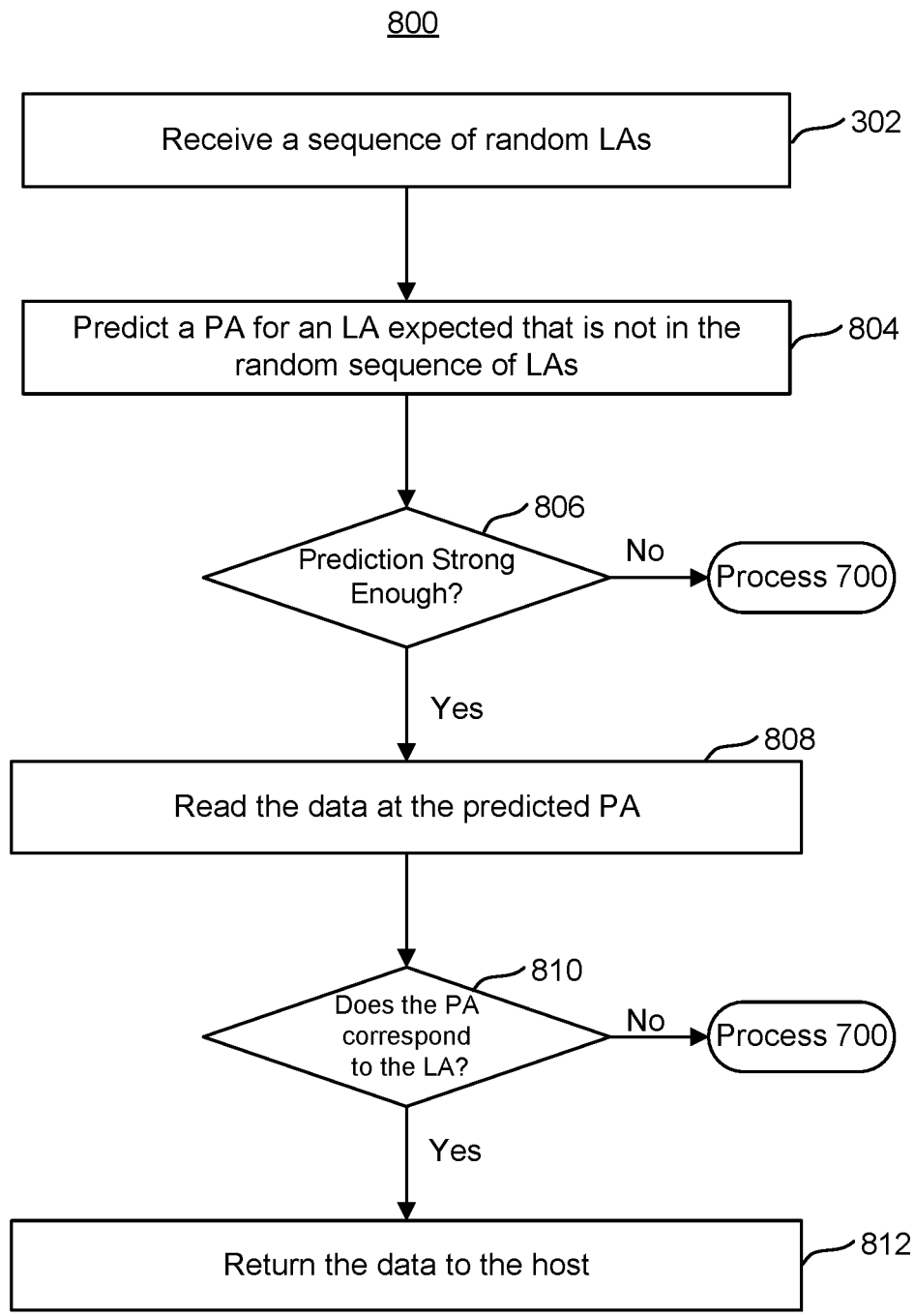
FIG. 8 is a flowchart of one embodiment of a process of returning data that a host requested for a logical address.

FIG. 8 is a flowchart of one embodiment of a process 800 of returning data that a host requested for a logical address. Process 800 provides further details of one embodiment of process 300. In process 800, the predicted physical address is for the host data 50 for the logical address. In other words, process 800 involves performing a data read. The process 800 may be used in a memory system 100 such as, but not limited to, the memory systems 100 in FIG. 1A, 1B, 1C, or 2. The process 800 may be performed by one or more control circuits in the memory system 100.

Step 302 includes receiving a sequence of random logical addresses. In one embodiment, the memory controller 122 receives a sequence of memory access requests from the host 140. Step 302 was discussed in connection with process 300.

Step 804 includes predicting a physical address for a logical address that is not in the sequence of random LAs from step 302. For example, the prediction may be for a logical address specified in a read request other than the memory access requests in step 302. In one embodiment, the logical address is a "following logical address." For example, a physical address may be predicted for a logical address in a read request that is expected to follow the sequence of memory access request of step 302.

Note that for the sake of explanation, process 800 provides an example in which just one physical address is discussed in step 804, 806, 808, and 810. However, note that it is possible to perform steps 804, 806, 808, and 810 in parallel for more than one predicted physical address. For example, step 804 could predict the "n" most likely location of host data 50 in structure 126.

Step 806 is a determination of whether the prediction is strong enough to warrant reading at the predicted physical address. Reading at the predicted physical address will consume some power, and may block another read operation of memory structure 126. Hence, there is some cost associated with making the read. The physical address predictor 250 may assign a probability that the host data is in fact stored at the predicted physical address. Thus, this probability may be balanced against the cost of making the read to determine whether to make the read. If the memory controller 122 determines that the prediction is not strong enough (step 806=no), then process 700 may be performed. Note that the non-predictive path is one option. Another option, to be described below, is to proceed using a prediction of another physical address. The other physical address might be in the host data 50 region of memory structure 126, or may be in the management table 60.

In one embodiment, the memory controller 122 uses a cost function to determine whether a read should be made at the predicted address. A cost function may attempt to minimize or otherwise take into account costs associated with reading data from memory structure 126, which may include sensing the data, transferring it from a memory die 108 to the memory controller 122 and performing error correction. Costs may be in terms of latency and/or power consumption. This is just one example of a cost function that can be used to determine whether a read should be made at the predicted address.

In one embodiment, step 806 determines an expected benefit of reading at the predicted physical address. For example, the expected benefit may be determined by multiplication of the expected probability (of the prediction being correct) with the expected reduced latency of reading at the predicted physical address.

In the event that the memory controller 122 determines that the prediction is strong enough to warrant a data read, then data at the predicted physical address is read at step 808. In process 800, this read is a data read.

Step 810 is a determination of whether the predicted physical address corresponds to the logical address for which the physical address was predicted. The logical address is stored as metadata with the host data 50 in memory structure 126, in some embodiments. Hence, after the data is read in step 808, the memory controller 122 may examine whether the logical address that was stored as metadata with the host data (at the predicted physical address) matches the logical address. If so, then the data from the predicted physical address may be returned to the host system 140 in step 812.

On the other hand, if the memory controller 122 determines that the physical address does not correspond to the logical address (e.g., the logical address that was stored as metadata with the data at the predicted physical address does not matches the logical address), then another action is taken to locate and provide the host data. As one example, process 700 may be performed. However, another option is to proceed with another predicted address. Note that process 700 was not started until it was determined that the predicted physical address did not contain the host data for the logical address. Another option is to start process 700 earlier. For example, process 700 might be started as soon as the logical address is available to the memory controller 122.

Figure 9:
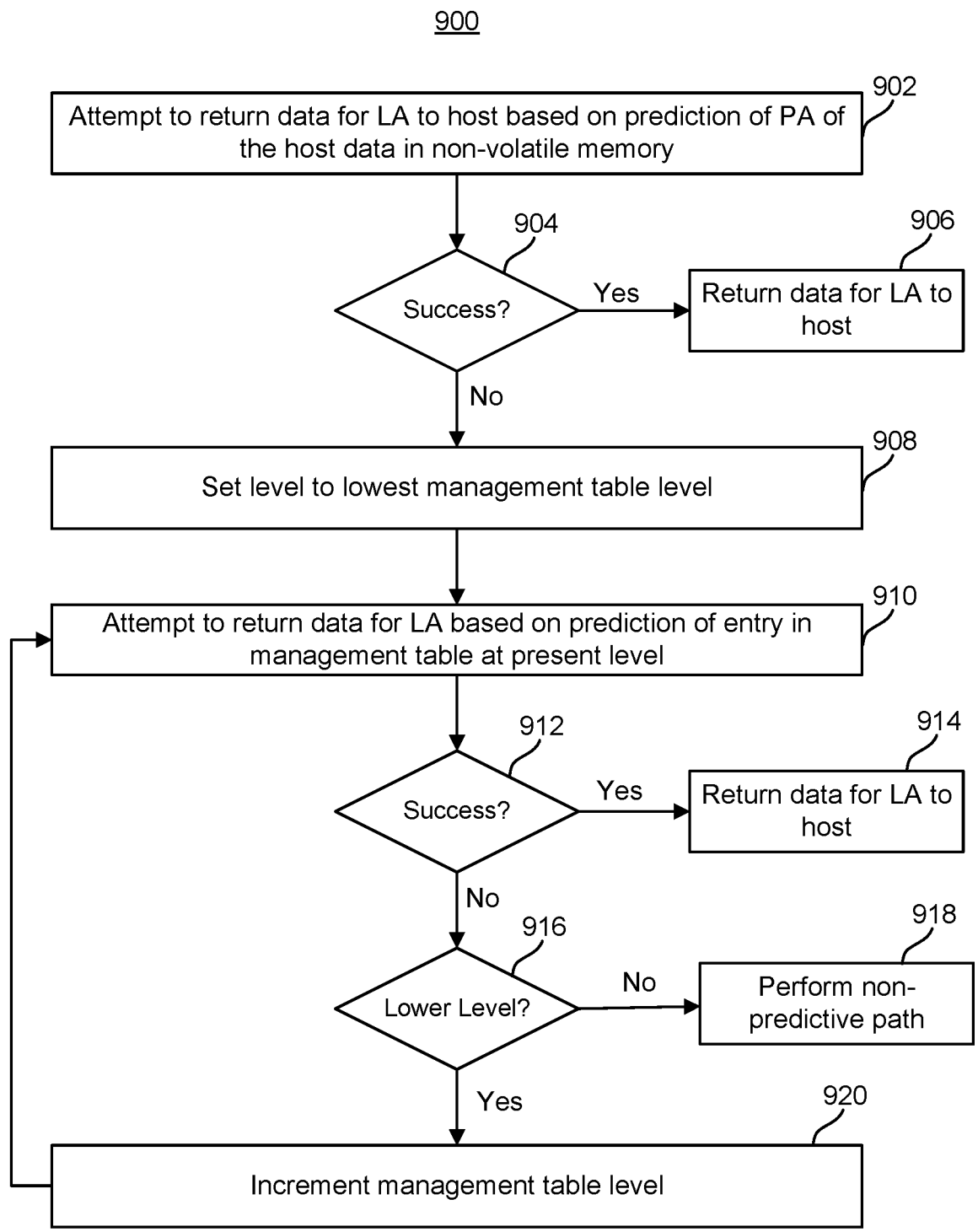
FIG. 9 is a flowchart of one embodiment of a process of attempting to return data for a logical address to a host based on predictions of various physical addresses.

FIG. 9 is a flowchart of one embodiment of a process 900 of attempting to return data for a logical address to a host system 140 based on predictions of various physical addresses. The physical addresses may include one or more physical addresses of host data 50, as well as one or more levels of a management table 60. Thus, process 900 may perform one or more data reads, as well as one or more control reads. Thus, process 900 may be used to augment process 800, by adding predictions for performing control reads. The process 900 may be used in a memory system 100 such as, but not limited to, the memory systems 100 in FIG. 1A, 1B, 1C, or 2. The process 900 may be performed by one or more control circuits in the memory system 100.

Reference will be made to FIG. 5 when discussing process 900. In process 900, the general flow is to first make zero or more data reads at predicted physical addresses in host data 50, and then to make zero or more control reads at each level of the management table 60, with management table 60-1 being the last level read, in one embodiment. This flow can lead to the fastest return of host data, as it can reduce the number of control reads. However, note that in other embodiments, the flow does not necessarily proceed in the aforementioned direction. For example, data reads could be performed in parallel with control reads. One such embodiment is discussed below in connection with FIG. 12.

Step 902 includes an attempt to return data to the host for the logical address (e.g., the following logical address) based on a prediction of where the data for the logical address is stored in non-volatile memory. In one embodiment, process 800 is performed for each of one or more predicted physical address in memory structure 126. Thus, process 800 may be performed in parallel for multiple predicted physical addresses. In one embodiment, the parallel reads in step 808 are performed on different memory die 108. Note that the reads in process 800 are data reads, in one embodiment.

Step 904 includes a determination of whether the attempt of step 902 was successful. For example, step 904 may be based on step 810 of process 800. Note that step 906 corresponds to step 812 in process 800.

If the attempt of step 902 was not successful, then control passes to step 908. Step 908 begins a sequence of steps in which one or more levels in the management table 60 is read. Step 908 includes setting a level of the management table to a lowest level. With respect to FIG. 5, the level may be set to the second level of the management table 60-2. The lowest level of the management table contains the physical address at which the host data is stored, in one embodiment. The lowest level may also be referred to as a leaf level, in one embodiment.

Step 910 includes an attempt to return data for the logical address based on a prediction in a management table at the present level. In the example of FIG. 5, the physical address predictor 250 predicts one or more entries 504 at management level 60-2. Briefly, the entry may contain a physical address at which host data 50 is predicted to be stored for the logical address. If the physical address indeed contains the host data for the logical address, this indicates success.

Step 912 is a determination of whether step 910 was successful at obtaining data for the logical address. Further details of determining success when the prediction is a physical address in the management table 60 will be discussed below. If step 910 was successful, the data is returned to the host in step 914. If step 910 was not successful, then control passes to step 916. Step 916 determines whether there is a higher level in the management table 60. In the example of FIG. 5, level 1 of management table 60-1 is higher than management table 60-2. Thus, the management table level is incremented in step 920.

Then control passes to step 910 to attempt to return data for the logical address by use of zero or more predictions of physical addresses the present level (e.g., 60-1) of management table. Step 912 is again a test of whether step 910 was successful for the present level. If so, the data is returned to the host in step 914. If not, control passes to step 916. In the example of FIG. 5, there are no higher levels of the management table 60. Hence, step 918 may be performed if predicting the various physical addresses was not successful at obtaining data for the logical address. Step 918 may include performing a non-predictive path. In one embodiment, process 700 is performed for step 918.

Figure 10:
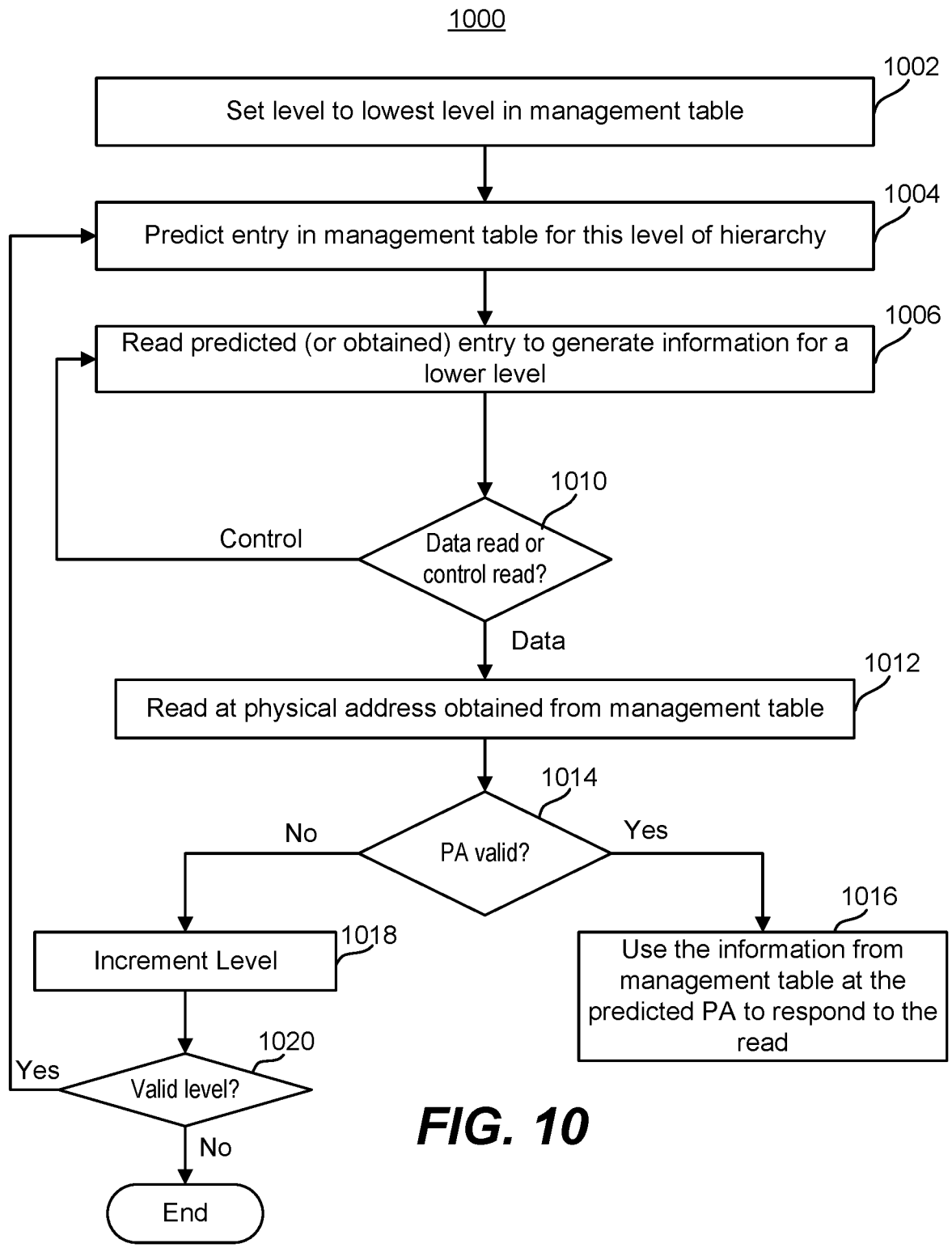
FIG. 10 is a flowchart of one embodiment of a process of predicting physical addresses in a management table and determining whether the predicted physical address contains valid information for obtaining data for the logical address.

FIG. 10 is a flowchart of one embodiment of a process 1000 of predicting physical addresses in a management table 60 and determining whether the predicted physical address contains valid information for obtaining data for the logical address. The process 1000 may be used in steps 910, 912, and 914 of process 900. In one embodiment, the process starts with the lowest level in the management table 60, which in the example of FIG. 5 is management table 60-1. Thus, the level is set to the lowest level in step 1002.

Step 1004 includes predicting an entry in the management table 60 for this level. For the sake of clarity, step 1002 will discuss predicting only one entry. However, note that step 1002 can be performed in parallel for multiple entries in the management table 60.

Step 1006 is to read at the predicted entry (or an obtained entry as will be discussed below) in the management table 60 to generate information for a lower level. As one example, with respect to FIG. 5, an entry 504 in management table 60-2 may be read to determine a physical address in host data 50. In this example, the host data 50 is considered to be a lower level than the management table 60.

Step 1010 is a determination of whether this is a control read or a data read. Assuming that this a data read, then step 1012 includes reading at the physical address obtained from the management table in step 1006. Note that this may be a data read of host data 50.

Step 1014 includes a determination of whether the predicted physical address (of step 1004) is valid. In other words, step 1014 may determine whether the predicted management table entry contained valid information for obtaining data for the logical address. Note that the data that was read in step 1012 may contain the logical address which the host uses to refer to that data. Thus, step 1014 may compare that logical address in the data read in step 1012 with the logical address for which the physical address (in this case a management table entry) was made. Note that this comparison may be similar to the one of step 810 in process 800.

If the predicted physical address had valid information (step 1014=yes), then control passes to step 1016. In step 1016, the data obtained in step 1012 may be returned to the host 140. On the other hand, if the predicted physical address did not contain valid information (step 1014=no), then the level of the management table may be incremented in step 1018. For the sake of discussed, it will be presumed that the level is set to management table 60-1. Since this is a valid level (step 1020=yes), process 1000 returns to step 1004 to predict a management table entry for the present level. Thus, note that process 1000 is working through the management table in the direction towards level 1 of the management table 60-1. Note however that if the memory controller determined in step 1020 that the level is not valid, then the process concludes. In this case, some other technique may be used to locate data for the logical address.

Hence, with reference to the example of FIG. 5, step 1004 may include predicting an entry 502 in level 1 of the management table 60-1. Step 1006 includes reading at the predicted entry to generate information for a lower level. For example, one of the entries 502 in management table 60-1 may be read to determine an index for reading one of the entries 504 in management table 60-2.

Step 1010 is again a determination of whether the information read in step 1006 is to be used for a data read or a control read. In the present example of FIG. 5, the read is a control read of an entry in level 2 of the management table 60-2. Thus, the process returns to step 1006 to read using the information that was obtained from the last time step 1006 was performed. In the present example of FIG. 5, one of the entries 504 in level 2 of the management table 60-2 is read. This read produces a physical address in host data 50, in this example. Thus, in step 1010, the memory controller 122 will determine that a data read is to be performed using the information obtained in the last performance of step 1006. The process 1000 then continues at step 1012 as previously described.

Note that in one embodiment, the management table 60 may contain metadata for validating whether the predicted physical address was valid. Thus, as an alternative to proceeding all the way to performing a data read to validate whether the read of a predicted physical address of the management table 60 was valid, the read can be validated when the management table 60 was read. With reference to process 1000, step 1006 may include reading metadata associated with the management table entry for which the physical address was predicted. The metadata may indicate (or be used to determine) a logical address for the management table entry for the predicted physical address. For example, the metadata might contain an LBA for the first entry in portion of the management table that was read. The physical address validator 260 may determine the LBA for the management table entry for the predicted physical address based on which entry corresponds to the predicted physical address. If it turns out that the prediction was not valid, further processing of the read based on the predicted physical address can be halted. In this case, the memory controller 122 may continue to attempt to respond to the read request based on other predicted physical addresses and/or the non-predictive path.

Figure 11:
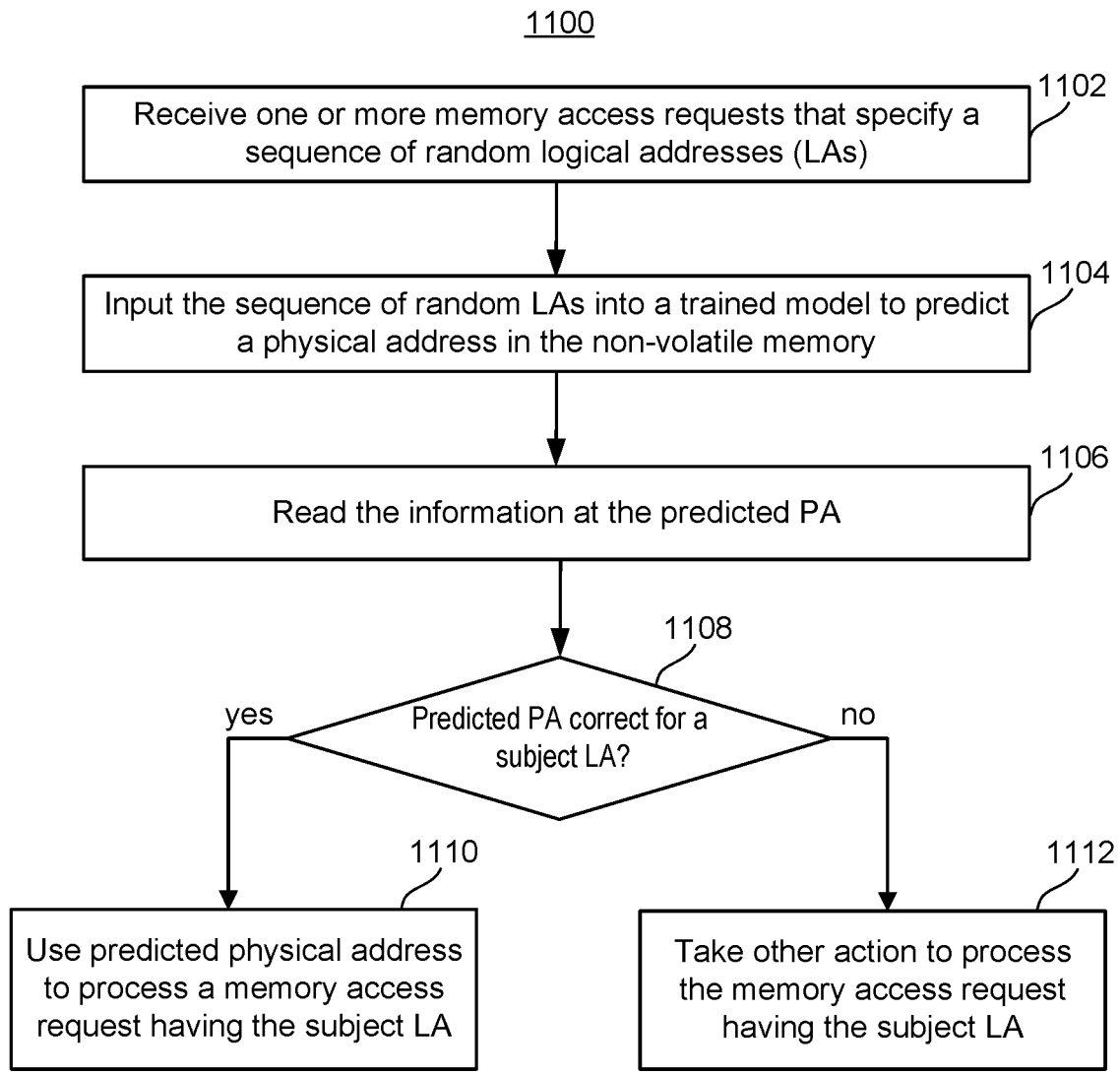
FIG. 11 is a flowchart of one embodiment of a process of operating non-volatile storage, including predicting a physical address using a trained model.

FIG. 11 is a flowchart of one embodiment of a process 1100 of operating non-volatile storage. The process 1100 may be used to predict a physical address for a logical address, wherein the prediction is based on a sequence of random logical addresses. Process 1100 involves the use of a trained model 460 to predict a physical address. Note that process 300 indicated that a trained model 460 could be used in one embodiment to predict a physical address. However, note that step 304 of process 300 included predicting a physical address at which information is stored for providing information for a logical address that is not in the sequence of random logical addresses (from step 302). Note that in process 1100 the trained model 460 may be used to predict a physical address for a logical address that is in the sequence of random logical addresses. However, the predicted physical address in process 1100 could alternatively be for a logical address that is not in the sequence of random logical addresses, such as a logical address that is expected to follow the sequence of random logical addresses.

The process 1100 may be used in a memory system 100 such as, but not limited to, the memory systems 100 in FIG. 1A, 1B, 1C, or 2. The process 1100 may be performed by one or more control circuits in the memory system 100. The one or more control circuits may include one or more of processor 122*c*, interface 122*d*, control circuitry 110, decoders 124/132, and read/write circuits 128. In one embodiment, memory controller 122 performs various steps in process 1100, including sending commands to the memory dies 108, which contain circuitry for accessing memory structure 126.

Step 1102 includes the memory controller 122 receiving one or more memory access requests that specify a sequence of random logical addresses (e.g., LBAs). By a sequence of "random" logical addresses it is meant that the logical addresses are not all consecutive. The logical addresses may be referred to as host logical addresses, in some embodiments. The sequence of "random" logical addresses may be in a sequence of memory access requests from the host 140. The sequence of memory access requests may include read requests and/or write requests. Each memory access request (e.g., read request, write request) may specify a logical address (e.g., LBA) and logical address range (e.g., LBA range).

Step 1104 includes the memory controller 122 inputting the sequence of random logical addresses into a trained model 460 to predict a physical address in non-volatile memory in memory structure 126. In one embodiment, the trained model 460 is a hidden Markoff model, which has been previously described. The physical address may be a prediction of a physical address that corresponds to a logical address in the sequence of random logical addresses. However, the physical address may instead be a prediction of a physical address that corresponds to a logical address that is not the sequence of random logical addresses. The logical address for which the prediction of the physical address is sought will be referred to as a "subject logical address."

The predicted physical address may be a physical address in the memory structure 126 at which host data 50 for the logical address is stored. The predicted physical address may be a physical address in the memory structure 126 at which a portion of the management table 60 is stored. Note that information in the management table 60 may be used to respond to the read request. For example, information in the management table 60 may be used to determine a physical address in memory structure 126 at which host data for the following logical address is stored. The physical address is not limited to these examples.

Step 1106 includes reading information at the predicted physical address. Step 1106 may include perform a read of host data 50 in the memory structure 126. Step 1106 may include performing a control read of a portion of a management table 60 in the memory structure. In the event that the predicted physical address is in the management table 60, then step 1106 may also include using information in the management table 60 to perform another read. For example, read of the management table 60 might yield a physical address of host data 50, where the data for the following logical address is stored. The read of the management table 60 might yield a physical address of a lower level of the management table 60. Then, the lower level of the management table 60 may be read to yield the physical address at which the host data is stored. The management table 60 might contain more than two levels. Thus, note that step 1106 may include returning host data 50 from memory structure 126 even when the predicted physical address is for a control read.

Step 1108 includes a determination of whether the predicted physical address is correct for a subject logical address. Note that the subject logical address may be in a memory access request that is in the one or more memory access requests in step 1102, or is not among the one or more memory access request in step 1102. The memory controller 122 may compare a logical address that is stored in metadata in a block of data read in step 1106 with the subject logical address to verify whether the predicted physical address is valid for the subject logical address.

Note that in some cases, the predicted physical address is for a control read of the management table 60. As noted above, the information in the management table 60 may be used to eventually make a data read of host data. In this case, the logical address in the metadata from the eventual data read may be compared with the subject logical address to verify whether the predicted physical address for the control read of the management table 60 was valid. Also, in some cases, the portion of the management table 60 that is read may contain metadata that indicates the logical addresses for that portion of the management table 60. Hence, this metadata may be used to verify whether the predicted physical address for the control read of the management table 60 was valid.

If the predicted physical address is correct for the subject logical address, then the predicted physical address is used to process the memory access request having the subject logical address. For example, the data read at the predicted logical address may be provided for the subject logical address to the host system 140, in step 1110. In one embodiment, the memory access request is a write request. In this case, the predicted physical address may be used to update a management table 60. Further details of one such embodiment is discussed in connection with FIG. 13.

If the predicted physical address is not correct (step 1108=no), then another action may be performed in step 1112 to process the memory access request. For example, another action can be performed to provide the data for the subject logical address to the host 140. One technique is to use a different physical address that is predicted by the memory controller 122 based on the sequence of random logical address of step 1102. Another technique is to not rely upon a predicted physical address. For example, rather than relying on a predicted physical address, the memory controller 122 may perform one or more control reads of the management table 60 to determine the physical address at which the host data for the subject logical address is stored.

Figure 12:
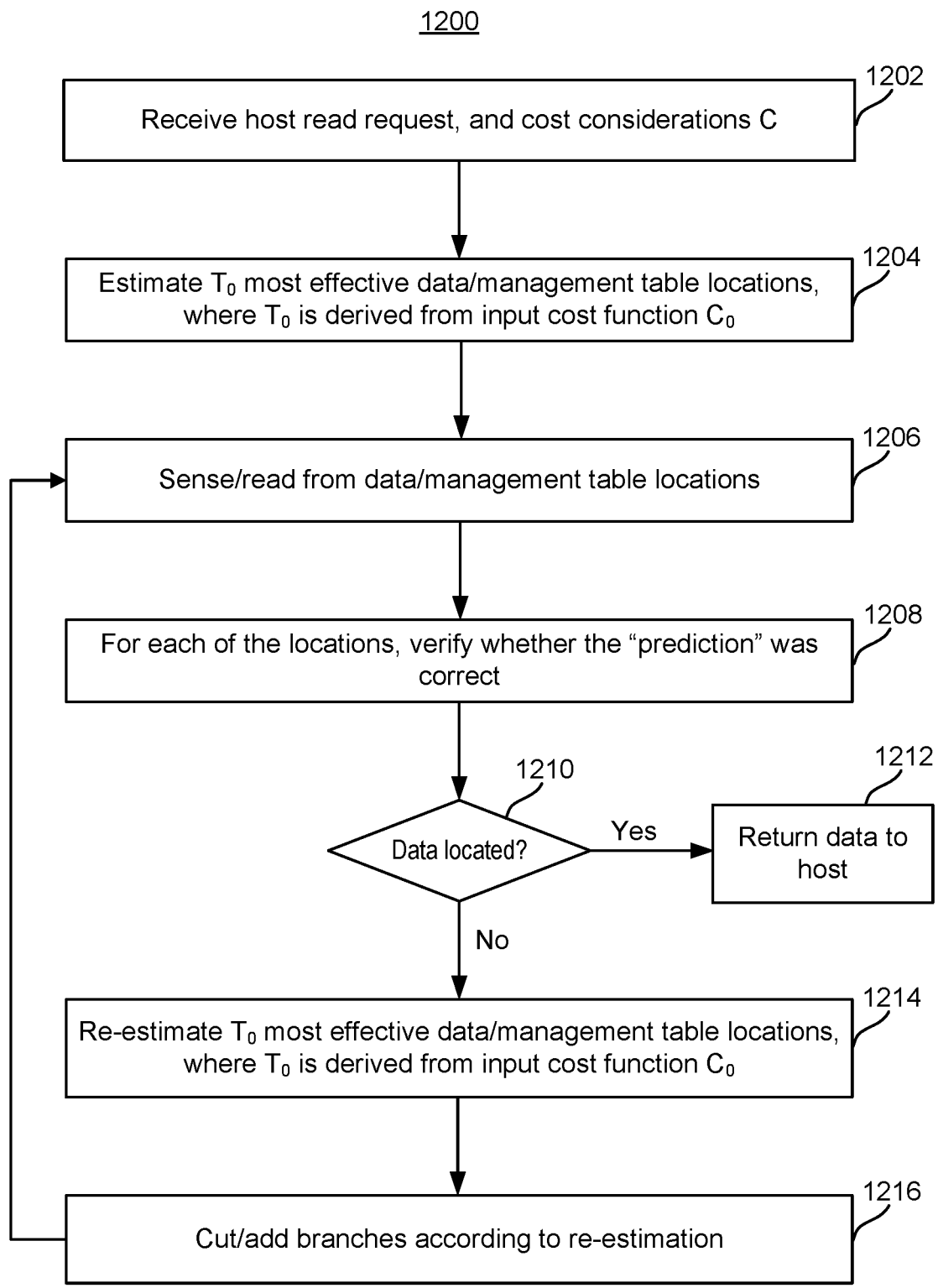
FIG. 12 is a flowchart of one embodiment of a process of responding to a read request from a host based on multiple predicted physical addresses for a logical address in the read request.

FIG. 12 is a flowchart of one embodiment of a process 1200 of responding to a read request from a host 140 based on multiple predicted physical addresses for a logical address in the read request. Note that the read request may be specify multiple logical addresses; however, process 1200 will discuss one logical address to facilitate explanation. The process 1200 can be expanded to predict physical addresses for multiple logical addresses specified by the read request. Process 1200 may predict physical addresses based on a sequence of random logical addresses, which may have been received by memory system 100 in memory access requests from host system 140. In one embodiment, process 1200 uses a pattern matcher 450 to predict a physical address that corresponds to a logical address that is not in the sequence of random logical addresses. In one embodiment, process 1200 uses trained model 460 to predict a physical address that corresponds to a logical address that is not in the sequence of random logical addresses. In one embodiment, process 1200 uses trained model 460 to predict a physical address that corresponds to a logical address that is in the sequence of random logical addresses.

Process 1200 may include predicting physical addresses for control reads and/or data reads. Process 1200 may include taking different "branches" to attempt to locate the data for the logical address in the read request. Each branch may be started by a prediction of a physical address. Thus, each branch may start with a control read or a data read. Process 1200 may "cut" a branch by halting any further processing based on the predicted physical address for that branch. Process 1200 may add new branches along the way. For example, the memory controller may make a new prediction of a physical address during the process 1200. Also, the memory controller 122 may start a new branch based on a prediction of a physical address that was previously made, but not yet acted upon. Thus, note that there may be one or more branches (each based on a different prediction) being processed in parallel during process 1200, branches being cut or added based on factors such as the success/failure of other branches.

Note that process 1200 may provide for a tradeoff between latency and power. For example, by performing many reads in parallel, the data might be returned more quickly at the expense of more power consumed. Thus, the decision of how may reads to perform in parallel may depend on the relative importance of power and latency.

Process 1200 may be used to implement one embodiment of process 300. Process 1200 may be used to implement one embodiment of process 1100. Note that the step of receiving one or more memory access requests that specify a sequence of random logical addresses may occur prior to or during process 1200. The process 1200 may be used in a memory system 100 such as, but not limited to, the memory systems 100 in FIG. 1A, 1B, 1C, or 2. The process 1200 may be performed by one or more control circuits in the memory system 100.

Step 1202 includes the memory controller 122 receiving a read request from the host system 140. The read request specifies a logical address for which data is to be provided to the host 140. The logical address is not in the sequence of random logical addresses, in one embodiment. However, the logical address could be one of the logical addresses in the random logical addresses. Step 1202 may be used for one embodiment of step 308 from process 300.

The memory controller 122 also receives cost considerations in step 1202. The cost considerations refer to factors to consider when calculating a cost of executing a branch. Possible cost considerations include, but are not limited to, a power budget, latency, resource availability (e.g., limited amount of ECC decoding machines).

Step 1204 includes the memory controller 122 estimating To most effective host data 50 and/or management table 60 locations. A most effective location is based on an estimated probability of finding information at the location that can be used to eventually provide data for the logical address in the read request, as well as a cost function in one embodiment. Thus, the $T_0$ most effective locations may be derived from a cost function $C_0$. The cost function $C_0$ may attempt to minimize or otherwise take into account costs associated with reading data from memory structure 126, which may include sensing the data, transferring it from a memory die 108 to the memory controller 122 and performing error correction. Costs may be in terms of latency, power consumption, availability of error correction machines, etc. This is just one example of a cost function $C_0$ that can be used to estimate $T_0$ most probable locations at which to read. Step 1204 uses the pattern matcher 450 to predict the $T_0$ most probable locations, in one embodiment. Step 1204 uses the trained model 460 to predict the $T_0$ most probable locations, in one embodiment.

In one embodiment, step 1204 determines an expected benefit of reading at each of several predicted physical addresses. For example, the expected benefit may be determined by multiplication of the expected probability (of the prediction being correct) with the expected reduced latency of reading at the predicted physical address. As one example, the best score might be a predicted address for a data read (this is closest to the data, minimizing number of needed control reads) that has a high probability of being correct. The worst score might be a predicted physical address for a control read at a high level of management table 60 (will require several control reads) that has a low probability of being correct. A range of intermediate scores can be determined that factor in the number of control reads and the probability of the prediction being correct.

Step 1206 includes reading at the $T_0$ most effective locations. Step 1206 may include zero or more control reads and zero or more data reads (assuming there is at least one data read or control read). Step 1206 may include multiple control reads. Step 1206 may include multiple data reads. In general, step 1206 may include any number of data reads and any number of control reads, providing there is at least one read (data read or control read).

Note that step 1206 may include sending the read requests for the $T_0$ most effective locations to the command sequencer 226. Herein, sending a read request to the command sequencer is an example of initiating a read procedure. The command sequencer 226 may select when to send the reads for the $T_0$ most effective locations to memory die 108. Multiple reads on memory die 108 may be performed in parallel, but it is not required for all reads to be performed in parallel. Herein, a parallel read is defined as there being an overlap between when a read request is received by a memory die 108 and when a memory die returns data for a read request to the memory controller 122. Step 1206 is one embodiment of step 306 from process 300.

Step 1208 includes a verification of whether the prediction of the physical addresses for the various branches (e.g., the $T_0$ most effective locations) was correct. For a data read, the verification can be performed as described in step 810. A similar verification may be used for a control read, but based on metadata in the management table 60 that may be used to determine a logical address associated with the predicted physical address. Step 1208 is one embodiment of step 310 from process 300.

Step 1210 includes a determination of whether the data for the logical address in the read request has been located. If so, then the data is returned to the host 140 in step 1212. Step 1212 is one embodiment of step 312 from process 300. Otherwise, the process 1200 continues at step 1214.

Step 1214 includes re-estimating $T_O$ most probable host data 50 and/or management table 60 locations. This step may be similar to step 1204. However, note that $T_O$ may be different from step 1204 (and may be different each time step 1214 is performed).

Step 1216 is to cut or add branches based on the $T_O$ most probable host data 50 and/or management table 60 locations that were estimated in step 1214. To cut a branch means after a control read means to not use the information from the control read. For example, if an PBA was determined from a read of management table L2 60-2, the PBA may be discarded. To cut a branch means after a data read means to not use the data that was read to respond to the read request. Th add a branch means to initiate processing of reading at a predicted physical address that was not previously attempted. This could be a control read or a data read.

The process 1200 then returns to step 1206 to read from the physical locations for the presently existing branches.

Figure 13:
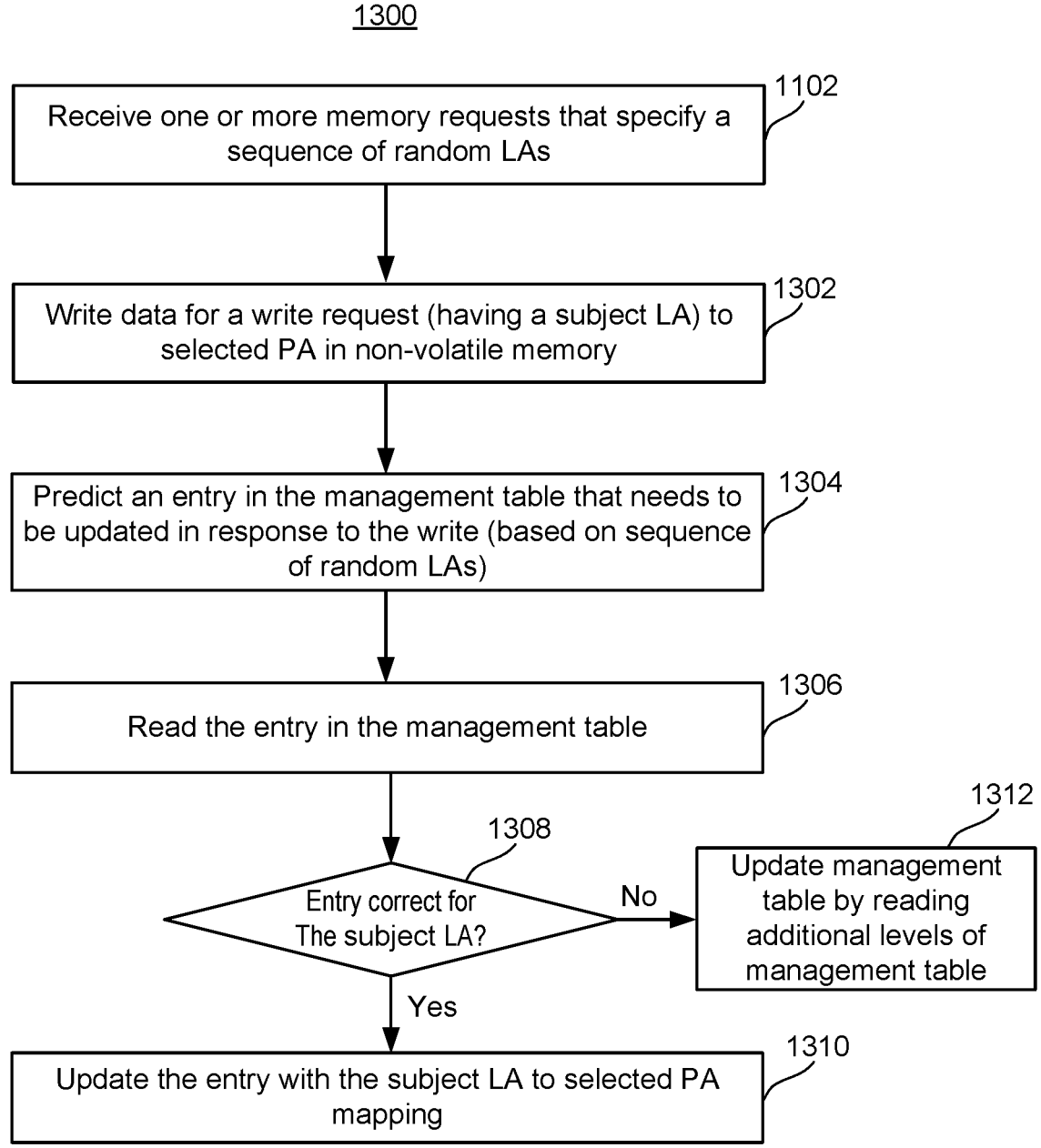
FIG. 13 is a flowchart of one embodiment of a process of updating an entry in a management table using a predicted entry in the management table.

FIG. 13 is a flowchart of one embodiment of a process 1300 of updating an entry in a management table using a predicted entry in the management table 60. The process 1300 is one embodiment of process 1100 in FIG. 11. The process 1300 may be used in a memory system 100 such as, but not limited to, the memory systems 100 in FIG. 1A, 1B, 1C, or 2. The process 1300 may be performed by one or more control circuits in the memory system 100.

Step 1102 includes receiving one or more memory requests that specify a sequence of random logical addresses (LAs). Step 1102 was discussed with respect to FIG. 11.

Step 1302 includes writing data for a write request (having a write LA) to a selected physical address (PA) in non-volatile memory in the memory structure 126. The write request could be one of the memory requests in the one or more memory requests from step 1102, but that is not required.

Step 1304 includes predicting an entry in a management table 60 that needs to be updated in response to the write. This prediction is based on the sequence of random logical addresses. Note that even if the memory controller has the logical address (e.g., LBA), the memory controller 122 might need to perform more than one control reads to obtain the entry that needs to be updated, were the prediction not performed. However, by performing the prediction, one or more control reads may be avoided.

Step 1306 includes reading the entry in the management table 60, based on the predicted physical address.

Step 1308 includes determining whether the entry is correct for the subject LA. In one embodiment, step 1308 includes reading metadata in the portion of the management table 60 that was read to verify whether the entry is indeed for the subject LA.

If the prediction was correct (step 1308=yes), then the entry in the management table 60 is updated in step 1310. For example, the write LA in the write request may be mapped to the selected physical address in memory structure 126 at which the data for the write request was written.

If the prediction was not correct (step 1308=no), then the management table 60 may be updated in step 1312 by reading additional levels of the management table 60. For example, one or more additional control reads may be performed to locate the correct entry to be updated.

A first embodiment disclosed herein includes an apparatus comprising: non-volatile memory; a communication interface configured to communicate with a host; and one or more control circuits in communication with the non-volatile memory and the communication interface. The one or more control circuits are configured to: generate a physical address in the non-volatile memory based on a sequence of random logical addresses from the host; read information at the physical address; and use the information at the physical address to provide data to the host for a logical address that is not in the sequence of random logical addresses in response to the information at the physical address being valid for providing data for the logical address that is not in the sequence of random logical addresses.

In a second embodiment, and in furtherance of the first embodiment, to generate the physical address, the one or more control circuits are configured to: compare the sequence of random logical addresses with stored patterns of logical addresses. Each of the stored patterns of logical addresses is associated with one or more physical addresses in the non-volatile memory. The one or more control circuits are configured to select a subset of a stored pattern based on the comparison. The one or more control circuits are configured to select, as the physical address, a physical address that follows the selected subset of the stored pattern.

In a third embodiment, and in furtherance of the first embodiment, to generate the physical address, the one or more control circuits are configured to: input the sequence of random logical addresses into a trained model that generates one or more physical addresses expected to follow a sequence of logical addresses that are input to the trained model. The one or more control circuits are configured to select, as the physical address, one of the physical addresses generated by the trained model.

In a fourth embodiment, and in furtherance of any of the first to third embodiments, the one or more control circuits are further configured to determine that a probability that the physical address contains valid information for providing data for the logical address that is not in the sequence is greater than a threshold as a condition to read the information at the physical address.

In a fifth embodiment, and in furtherance of any of the first to fourth embodiments, the physical address is a first physical address. The one or more control circuits are further configured to: use the sequence of random logical addresses to generate additional physical addresses in the non-volatile memory; determine expected benefits of reading at the first physical address and the additional physical addresses; and select the first physical address as a location to read at based on the expected benefits.

In a sixth embodiment, and in furtherance of the fifth embodiment, the one or more control circuits are further configured to select at least one of the additional physical addresses as locations to read based on the expected benefits.

In a seventh embodiment, and in furtherance of the sixth embodiment, the one or more control circuits are further configured to read at the first physical address and the at least one selected additional physical address in parallel.

In an eighth embodiment, and in furtherance of the seventh embodiment, the one or more control circuits are further configured to: initiate a read procedure at the first physical address and the at least one selected additional physical address in parallel; and halt the read procedure at the at least one selected additional physical address in response to a determination that the information at the first physical address is valid for providing data for the logical address that is not in the sequence of random logical addresses.

In a ninth embodiment, and in furtherance of any of the first to eighth embodiments, the physical address is a first physical address; the one or more control circuits being configured to read the information at the first physical address comprises the one or more control circuits being configured to perform a control read of a management table to determine a second physical address in the non-volatile memory.

In a tenth embodiment, and in furtherance of the ninth embodiment, the one or more control circuits being configured to use the information at the first physical address comprises the one or more control circuits being configured to: read data at the second physical address; and provide the data to the host over the communication interface.

In an eleventh embodiment, and in furtherance of any of the first to tenth embodiments, the one or more control circuits being configured to use the information at the physical address comprises the one or more control circuits being configured to: provide the information that was read at the physical address to the host over the communication interface in response to a read request from the host that specifies the logical address that is not in the sequence of random logical addresses.

In a twelfth embodiment, and in furtherance of any of the first to eleventh embodiments the one or more control circuits are further configured to update a technique used to generate physical addresses based on a sequence of random logical addresses in response to the information at the physical address not being valid for providing data for the logical address that is not in the sequence of random logical addresses.

One embodiment disclosed herein includes a method of operating a memory system, the method comprising: receiving, at the memory system, a plurality of memory access requests that specify a sequence of random logical addresses; predicting a physical address in non-volatile memory of the memory system at which data is stored for a logical address that is expected to follow the sequence of random logical addresses; reading data at the predicted physical address; receiving a read request that specifies a logical address after receiving the plurality of memory access requests; determining whether the data that was read at the predicted physical address is the data for the logical address of the read request; and responding to the read request with the data at the predicted physical address in response to determining that the data at the predicted physical address is the data for the logical address of the read request.

One embodiment disclosed herein includes a memory system comprising: non-volatile memory; communication means for receiving requests to access the non-volatile memory, each of the requests specifying one or more logical addresses; address prediction means for predicting at least one physical address in the non-volatile memory at which information is stored for providing data for a logical address that is expected to follow a sequence of random logical addresses; sensing means for reading the information at the at least one predicted physical address; validation means for validating whether the information at the at least one predicted physical address is valid for providing data for the logical address that is expected to follow the sequence; and response means for using the information at a first of the predicted physical addresses to provide data over the communication means for the logical address that is expected to follow the sequence responsive to the information at the first predicted physical address being valid.

In one embodiment, the communication means comprises one or more of front end module 208, PHY 222, processor 122c, interface 120, an electrical circuit, an application specific integrated circuit (ASIC), a Field Programmable Gate Array (FPGA), a digital logic circuit, an analog circuit, a combination of discrete circuits, gates, and/or a portion of a program code (e.g., software or firmware) executable by a (micro)processor or processing circuitry (or one or more processors). However, the communication means could include other hardware and/or software.

In one embodiment, the address prediction means comprises one or more of physical address predictor 250, pattern matcher 450, processor 122c, an electrical circuit, an application specific integrated circuit (ASIC), a Field Programmable Gate Array (FPGA), a digital logic circuit, an analog circuit, a combination of discrete circuits, gates, and/or a portion of a program code (e.g., software or firmware) executable by a (micro)processor or processing circuitry (or one or more processors). However, the address prediction means could include other hardware and/or software.

In one embodiment, the sensing means comprises one or more of sense block 150, read/write circuits 128, decoders 114/124/132, power control 116, state machine 112, sequencer 226, processor 122c, an electrical circuit, an application specific integrated circuit (ASIC), a Field Programmable Gate Array (FPGA), a digital logic circuit, an analog circuit, a combination of discrete circuits, gates, and/or a portion of a program code (e.g., software or firmware) executable by a (micro)processor or processing circuitry (or one or more processors). However, the sensing means could include other hardware and/or software.

In one embodiment, the validation means comprises one or more of physical address validator 260, processor 122c, an electrical circuit, an application specific integrated circuit (ASIC), a Field Programmable Gate Array (FPGA), a digital logic circuit, an analog circuit, a combination of discrete circuits, gates, and/or a portion of a program code (e.g., software or firmware) executable by a (micro)processor or processing circuitry (or one or more processors). However, the validation means could include other hardware and/or software.

In one embodiment, the response means comprises one or more of ECC 224, processor 122c, front end module 208, host interface 220, PHY 222, an electrical circuit, an application specific integrated circuit (ASIC), a Field Programmable Gate Array (FPGA), a digital logic circuit, an analog circuit, a combination of discrete circuits, gates, and/or a portion of a program code (e.g., software or firmware) executable by a (micro)processor or processing circuitry (or one or more processors). However, the response means could include other hardware and/or software.

One embodiment disclosed herein includes a memory system comprising: non-volatile memory; a communication interface configured to communicate with a host; and one or more control circuits in communication with the non-volatile memory and the communication interface. The one or more control circuits configured to: receive memory access requests having a sequence of random logical addresses; use the sequence of random logical addresses to predict a physical address in the non-volatile memory; read information at the predicted physical address; receive a read request from the host after receiving the memory access requests; determine whether the information at the predicted physical address is valid for providing data for the read request; and use the information at the predicted physical address to provide data for the read request in response to the information being valid.

One embodiment disclosed herein includes a memory system comprising: non-volatile memory; a communication interface configured to communicate with a host; and one or more control circuits in communication with the non-volatile memory and the communication interface. The one or more control circuits configured to receive a plurality of memory access requests from the host. The plurality of memory access requests specifying a sequence of random logical addresses. The one or more control circuits configured to input the sequence of random logical addresses to a trained model to predict a physical address in the non-volatile memory. The predicted physical address being for a subject logical address specified by a selected memory access request from the host. The selected memory access request either being in the plurality of memory access requests or received from the host after the memory system receives the plurality of memory access requests. The one or more control circuits configured to access the physical address to process the selected memory access request responsive to a validation that the prediction of the physical address is correct for the subject logical address.

For the purpose of this document, the terms "write" and "store" are often used interchangeably, as are the terms "writing" and "storing."

For purposes of this document, reference in the specification to "an embodiment," "one embodiment," "some embodiments," or "another embodiment" may be used to describe different embodiments or the same embodiment.

For purposes of this document, a connection may be a direct connection or an indirect connection (e.g., via one or more others parts). In some cases, when an element is referred to as being connected or coupled to another element, the element may be directly connected to the other element or indirectly connected to the other element via intervening elements. When an element is referred to as being directly connected to another element, then there are no intervening elements between the element and the other element. Two devices are "in communication" if they are directly or indirectly connected so that they can communicate electronic signals between them.

For purposes of this document, the terms "based on" and "in dependence on" may be read as "based at least in part on."

While various embodiments of the present technology have been described above, it should be understood that they have been presented by way of example, and not limitation. It will be apparent to persons skilled in the relevant art that various changes in form and detail can be made therein without departing from the spirit and scope of the technology. For example, although a few variations have been described in detail above, other modifications or additions are possible. In particular, further features and/or variations may be provided in addition to those set forth herein. For example, the implementations described above may be directed to various combinations and sub-combinations of the disclosed features and/or combinations and sub-combinations of several further features disclosed above. In addition, the logic flow depicted in the accompanying figures and/or described herein do not require the particular order shown, or sequential order, to achieve desirable results. Other embodiments may be within the scope of the following claims.

Embodiments of the present technology have been described above with the aid of functional building blocks illustrating the performance of specified functions and relationships thereof. The boundaries of these functional building blocks have often been defined herein for the convenience of the description. Alternate boundaries can be defined so long as the specified functions and relationships thereof are appropriately performed. Any such alternate boundaries are thus within the scope and spirit of the claimed technology. One skilled in the art will recognize that these functional building blocks can be implemented by discrete components, application specific integrated circuits, processors executing appropriate software and the like or any combination thereof.

The breadth and scope of the present technology should not be limited by any of the above-described exemplary embodiments, but should be defined only in accordance with the following claims and their equivalents.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The foregoing detailed description has been presented for purposes of illustration and description. It is not intended to be exhaustive or to limit to the precise form disclosed. Many modifications and variations are possible in light of the above teaching. The described embodiments were chosen in order to best explain the principles of the proposed technology and its practical application, to thereby enable others skilled in the art to best utilize it in various embodiments and with various modifications as are suited to the particular use contemplated. It is intended that the scope be defined by the claims appended hereto.

What is claimed is:

1. An apparatus comprising:
   non-volatile memory;
   a communication interface configured to communicate with a host; and
   one or more control circuits in communication with the non-volatile memory and the communication interface, the one or more control circuits configured to:
   generate a physical address in the non-volatile memory based on a sequence of random logical addresses from the host without using a subject logical address that is not in the sequence of random logical addresses to determine the physical address and without using the subject logical address to make a control read of a table that maps logical addresses to physical addresses in the non-volatile memory;
   read information at the physical address, the information comprises data and a logical address of the data;
   receive a request from the host for data for the subject logical address;
   compare the logical address stored in the information with the subject logical address; and
   provide the data to the host in response to the logical address stored in the information matching the subject logical address in the request.

2. The apparatus of claim 1, wherein to generate the physical address, the one or more control circuits are configured to:
   compare the sequence of random logical addresses with stored patterns of logical addresses, each of the stored patterns of logical addresses associated with one or more physical addresses in the non-volatile memory;

select a subset of a stored pattern based on the comparison; and select, as the physical address, a physical address that follows the selected subset of the stored pattern.

3. The apparatus of claim 1 wherein, to generate the physical address, the one or more control circuits are configured to:

input the sequence of random logical addresses into a trained model that generates one or more physical addresses expected to follow a sequence of logical addresses that are input to the trained model; and select, as the physical address, one of the physical addresses generated by the trained model.

4. The apparatus of claim 1, wherein the one or more control circuits are further configured to:

determine that a probability that the physical address contains valid information for providing data for the subject logical address that is not in the sequence is greater than a threshold as a condition to read the information at the physical address.

5. The apparatus of claim 1, wherein the physical address is a first physical address, wherein the one or more control circuits are further configured to:

use the sequence of random logical addresses to generate additional physical addresses in the non-volatile memory;

determine expected benefits of reading at the first physical address and the additional physical addresses; and select the first physical address as a location to read at based on the expected benefits.

6. The apparatus of claim 5, wherein the one or more control circuits are further configured to:

select at least one of the additional physical addresses as locations to read based on the expected benefits.

7. The apparatus of claim 6, wherein the one or more control circuits are further configured to:

read at the first physical address and the at least one selected additional physical address in parallel.

8. The apparatus of claim 7, wherein the one or more control circuits are further configured to:

initiate a procedure to read at the first physical address and the at least one selected additional physical address in parallel; and halt the read procedure at the at least one selected additional physical address in response to a determination that the information at the first physical address is valid for providing data for the subject logical address that is not in the sequence of random logical addresses.

9. The apparatus of claim 1, wherein the one or more control circuits are further configured to update a technique used to generate physical addresses based on a sequence of random logical addresses in response to the logical address stored in the information not matching the subject logical address.

10. A method of operating a memory system, the method comprising:

receiving, at the memory system, a plurality of memory access requests that collectively specify a sequence of random logical addresses;

predicting a physical address in non-volatile memory of the memory system at which data is stored fora logical address that is expected to follow the sequence of random logical addresses, the predicting made without using a logical address that is not in the sequence of random logical addresses to predict the physical address and without making a control read of a management table that maps from logical addresses to physical addresses in the non-volatile memory;

reading data and a logical address at the predicted physical address;

receiving a read request that specifies a logical address after receiving the plurality of memory access requests;

determining whether the logical address that was read at the predicted physical address is the data for the logical address of the read request; and responding to the read request with the data at the predicted physical address in response to determining that the logical address at the predicted physical address is the data for the logical address of the read request.

11. The method of claim 10, wherein predicting the physical address comprises:

comparing the sequence of random logical addresses with stored patterns of logical addressees, each of the stored patterns associated with one or more physical addresses in the non-volatile memory;

selecting a subset of a stored pattern based on the comparison; and selecting, as the predicted physical address, a physical address that follows the selected subset of the stored pattern.

12. The method of claim 10, wherein predicting the physical address comprises:

inputting the sequence of random logical addresses into a trained model that outputs a physical address that is expected to follow a sequence of logical addresses; and selecting the physical address that is output by the trained model as the predicted physical address.

13. The method of claim 10, further comprising:

predicting at least one additional physical address in the non-volatile memory of the memory system at which data is stored for the logical address;

initiating procedures to read data at the at least one additional physical address; and halting the procedures to read data at the at least one additional physical address in response to determining that the data at the predicted physical address is the data for the logical address.

14. A memory system comprising:

non-volatile memory;

communication means for receiving requests to access the non-volatile memory, each of the requests specifying one or more logical addresses;

address prediction means for predicting at least one physical address in the non-volatile memory at which information is stored for providing data fora logical address that is expected to follow a sequence of random logical addresses, the address prediction means for predicting the at least one physical address without using a logical address that is not in the sequence of random logical addresses and without accessing a management table that maps from logical addresses to physical addresses in the non-volatile memory;

sensing means for reading the information at the at least one predicted physical address, the information comprises data and a logical address of the data;

means for receiving a request from a host for data fora subject logical address;

validation means for validating whether the logical address at the at least one predicted physical address is the subject logical address; and response means for using the data at a first predicted physical address of the at least one predicted physical address to provide data over the communication means for the subject logical address responsive to the logical address at the first predicted physical address being the subject logical address.

15. The memory system of claim 14, wherein the address prediction means is further for using the sequence of random logical addresses to predict the at least one physical address without accessing a table that translates from host logical addresses to physical addresses in the non-volatile memory.

16. A memory system comprising:
non-volatile memory;
a communication interface configured to communicate with a host; and
one or more control circuits in communication with the non-volatile memory and the communication interface, the one or more control circuits configured to:
receive memory access requests having a sequence of random logical addresses;
use the sequence of random logical addresses to predict a first physical address in the non-volatile memory, the first physical address being of an entry in a second or higher level of a hierarchical structure that is used to translate host logical addresses to physical addresses in the non-volatile memory, wherein a first level of the hierarchical structure is indexed by logical addresses and a last level of the hierarchical structure provides physical addresses, the prediction made without using a subject logical address that is not in the sequence of random logical addresses to make a control read of the first level;
read information in the entry at the second or higher level without performing a control read of any level below the level of the predicted physical address;
read data and metadata at a second physical address in the non-volatile memory that is determined based on the information in the entry at the second or higher level, the metadata includes a logical address of the data at the second physical address;
receive a read request from the host that contains the subject logical address;
compare the logical address stored in the metadata with the subject logical address; and
provide the data at the second physical address to the host responsive to the logical address stored in the metadata matching the subject logical address.

17. A memory system comprising:
non-volatile memory;
a communication interface configured to communicate with a host; and
one or more control circuits in communication with the non-volatile memory and the communication interface, the one or more control circuits configured to:
receive a plurality of memory access requests from the host, the plurality of memory access requests specifying a sequence of random logical addresses;
input the sequence of random logical addresses to a trained model to predict a physical address in the non-volatile memory, the physical address being an entry in a structure that requires multiple control reads to translate from a host logical address to a physical address in the non-volatile memory, the prediction made without use of the structure;
receive a request from the host to write data to a subject logical address that is not in the sequence of random logical addresses;
write data for the subject logical address to a selected physical address in the non-volatile memory;
read metadata in the entry that identifies a logical address while avoiding one or more control reads of the structure;
determine whether the logical address in the metadata matches the subject logical address; and
update the entry to map from the subject logical address in the write request to the selected physical address responsive to the logical address in the metadata matching the subject logical address.

18. The memory system of claim 17, wherein the one or more control circuits are further configured to:
train the model to predict one or more physical addresses for a sequence of random logical addresses in memory access requests from the host.

19. The memory system of claim 17, wherein the trained model is a hidden Markoff model.

* * * * *